(12) United States Patent
Ma et al.

(10) Patent No.: US 12,228,714 B2
(45) Date of Patent: Feb. 18, 2025

(54) OPTICAL SYSTEM

(71) Applicants: Sintai Optical (Shenzhen) Co., Ltd., Guandong (CN); Asia Optical Co., Inc., Taichung (TW)

(72) Inventors: Fang-Li Ma, ShenZhen (CN); Bin Liu, ShenZhen (CN); Fei Han, ShenZhen (CN); Ling-Wei Zhao, ShenZhen (CN); Yue-Ye Chen, ShenZhen (CN); Hua-Tang Liu, Taichung (TW)

(73) Assignees: SINTAI OPTICAL (SHENZHEN) CO., LTD., Shenzhen (CN); ASIA OPTICAL CO., INC., Taichung (TW)

(*) Notice: Subject to any disclaimer, the term of this patent is extended or adjusted under 35 U.S.C. 154(b) by 321 days.

(21) Appl. No.: 18/145,102

(22) Filed: Dec. 22, 2022

(65) Prior Publication Data

US 2023/0288683 A1 Sep. 14, 2023

(30) Foreign Application Priority Data

Mar. 14, 2022 (CN) .......................... 202210248054.4

(51) Int. Cl.
  G02B 15/14 (2006.01)
  G02B 13/00 (2006.01)
  G02B 15/173 (2006.01)

(52) U.S. Cl.
  CPC ....... G02B 15/1461 (2019.08); G02B 13/006 (2013.01); G02B 15/173 (2013.01)

(58) Field of Classification Search
  CPC .. G02B 13/006; G02B 13/02; G02B 15/1461; G02B 15/173
  See application file for complete search history.

(56) References Cited

U.S. PATENT DOCUMENTS

| | | | |
|---|---|---|---|
| 6,130,714 A | 10/2000 | Abe et al. | |
| 7,995,284 B2 | 8/2011 | Matsui | |
| 10,423,004 B2 | 9/2019 | Arai | |
| 2020/0371375 A1 | 11/2020 | Fiedler et al. | |

FOREIGN PATENT DOCUMENTS

| | | |
|---|---|---|
| CN | 102103253 A | 6/2011 |
| CN | 105659138 A | 6/2016 |
| JP | H01231013 A | 9/1989 |
| JP | H09325268 A | 12/1997 |
| JP | H11132298 A | 5/1999 |
| JP | 2002296500 A | 10/2002 |
| JP | 2008089659 A | 4/2008 |
| JP | 2016148698 A | 8/2016 |

Primary Examiner — Jack Dinh
(74) Attorney, Agent, or Firm — McClure, Qualey & Rodack, LLP

(57) ABSTRACT

An optical system includes an objective lens module, an image inverting module, and an eyepiece module. The objective lens module includes a first lens group, a second lens group, a third lens group, a fourth lens group, and a fifth lens group. The optical system satisfies at least one of the following conditions: $0.45 \leq LG4D/LG1D \leq 0.8$; $0.015\ mm^{-1} \leq 1/fG3 \leq 0.045\ mm^{-1}$; $0.045\ mm^{-1} \leq |1/fG4| \leq 0.07\ mm^{-1}$; $0.35 \leq |fG4/fG3| \leq 0.75$; $0.15 \leq fG1/f \leq 1.6$; wherein LG4D is an effective optical diameter of the fourth lens group, LG1D is an effective optical diameter of the first lens group, fG1 is an effective focal length of the first lens group, fG3 is an effective focal length of the third lens group, fG4 is an effective focal length of the fourth lens group, and f is an effective focal length of the objective lens module.

18 Claims, 28 Drawing Sheets

OPTICAL SYSTEM

BACKGROUND OF THE INVENTION

Field of the Invention

The invention relates to an optical system.

Description of the Related Art

It is known that the optical system with the optical image stabilization function has a larger dimension. In order to achieve a larger compensation angle, the required optical anti-shake element must be enlarged and the moving distance of the optical anti-shake element must also be increased, resulting in the dimensions of the optical system increasing. The conventional optical system can't satisfy such requirements. Therefore, the optical system needs a new structure in order to meet the requirements of larger compensation angle and smaller dimension at the same time.

BRIEF SUMMARY OF THE INVENTION

The invention provides an optical system to solve the above problems. The optical system of the invention is provided with characteristics of an increased compensation angle, a decreased dimension, and still has a good optical performance.

The optical system in accordance with an exemplary embodiment of the invention includes an objective lens module, an image inverting module, and an eyepiece module, all of which are arranged in order from an object side to an image side along an optical axis. The objective lens module is with refractive power and includes a first lens group, a second lens group, a third lens group, a fourth lens group, and a fifth lens group. The first lens group, the second lens group, the third lens group, the fourth lens group, and the fifth lens group are arranged in order from the object side to the image side along the optical axis. The optical system satisfies at least one of the following conditions: $0.45 \leq LG4D/LG1D \leq 0.8$; $0.015 \text{ mm}^{-1} \leq 1/fG3 \leq 0.045 \text{ mm}^{-1}$; $0.045 \text{ mm}^{-1} \leq |1/fG4| \leq 0.07 \text{ mm}^{-1}$; $0.35 \leq |fG4/fG3| \leq 0.75$; $0.15 \leq fG1/f \leq 1.6$; wherein LG4D is an effective optical diameter of the fourth lens group, LG1D is an effective optical diameter of the first lens group, fG1 is an effective focal length of the first lens group, fG3 is an effective focal length of the third lens group, fG4 is an effective focal length of the fourth lens group, and f is an effective focal length of the objective lens module.

In another exemplary embodiment, the image inverting module includes a first prism and a second prism; the eyepiece module is with refractive power and includes a sixth lens group, a seventh lens group, and an eighth lens group; the sixth lens group, the seventh lens group, and the eighth lens group are arranged in order from the object side to the image side along the optical axis; the first lens group is with positive refractive power; the second lens group is with refractive power and includes a third lens, wherein the third lens includes a concave surface facing the image side; the third lens group is with positive refractive power and includes a fourth lens, wherein the fourth lens includes a convex surface facing the object side; the fourth lens group is with negative refractive power and includes a fifth lens, wherein the fifth lens is a biconcave lens with negative refractive power and includes a concave surface facing the object side and another concave surface facing the image side; the fifth lens group is with refractive power and includes a sixth lens, wherein the sixth lens is with negative refractive power and includes a concave surface facing the object side; the sixth lens group is with refractive power; the seventh lens group is with refractive power; the eighth lens group is with refractive power; the second lens group can move along the optical axis, so that the optical system can achieve focus; and the fourth lens group can move along the direction perpendicular to the optical axis, so that the optical system can achieve optical image stabilization.

In yet another exemplary embodiment, the fifth lens group includes a sixth lens and an eleventh lens, wherein the eleventh lens is disposed between the sixth lens and the image inverting module; the sixth lens is with negative refractive power and includes a concave surface facing the object side; and the eleventh lens is a biconvex lens with positive refractive power and includes a convex surface facing the object side and another convex surface facing the image side.

In another exemplary embodiment, the second lens group is with positive refractive power and the third lens is a meniscus lens and further includes a convex surface facing the object side; the fourth lens is a meniscus lens with positive refractive power and further includes a concave surface facing the image side; the fifth lens group is with negative refractive power and the sixth lens is a biconcave lens with negative refractive power and further includes another concave surface facing the image side; the sixth lens and the eleventh lens are cemented; the sixth lens group is with positive refractive power and includes a seventh lens and an eighth lens, wherein the seventh lens is a biconcave lens with negative refractive power and includes a concave surface facing the object side and another concave surface facing the image side, the eighth lens is a biconvex lens with positive refractive power and includes a convex surface facing the object side and another convex surface facing the image side, the seventh lens and the eighth lens are arranged in order from the object side to the image side along the optical axis, and the seventh lens and the eighth lens are cemented; the seventh lens group is with positive refractive power and includes a ninth lens, wherein the ninth lens is a biconvex lens with positive refractive power and includes a convex surface facing the object side and another convex surface facing the image side; and the eighth lens group is with positive refractive power and includes a tenth lens, wherein the tenth lens is a plano-convex lens with positive refractive power and includes a convex surface facing the object side and a plane surface facing the image side.

In yet another exemplary embodiment, the first lens group includes a first lens and a second lens; the first lens is a biconvex lens with positive refractive power and includes a convex surface facing the object side and another convex surface facing the image side; the second lens is a biconcave lens with negative refractive power and includes a concave surface facing the object side and another concave surface facing the image side; the first lens and the second lens are cemented; and the first lens and the second lens are arranged in order from the object side to the image side along the optical axis.

In another exemplary embodiment, the second lens group is with positive refractive power and the third lens is a meniscus lens and further includes a convex surface facing the object side; the fourth lens is a biconvex lens with positive refractive power and further includes another convex surface facing the image side; the fifth lens group is with positive refractive power and the sixth lens is a biconcave lens with negative refractive power and further includes another concave surface facing the image side; the sixth lens and the eleventh lens are cemented; the sixth lens group is with positive refractive power and includes a seventh lens and an eighth lens, wherein the seventh lens is a biconcave lens with negative refractive power and includes a concave surface facing the object side and another concave surface facing the image side, the eighth lens is a biconvex lens with positive refractive power and includes a convex surface facing the object side and another convex surface facing the image side, the seventh lens and the eighth lens are arranged in order from the object side to the image side along the optical axis, and the seventh lens and the eighth lens are cemented; the seventh lens group is with positive refractive power and includes a ninth lens, wherein the ninth lens is a biconvex lens with positive refractive power and includes a convex surface facing the object side and another convex surface facing the image side; and the eighth lens group is with positive refractive power and includes a tenth lens, wherein the tenth lens is a plano-convex lens with positive refractive power and includes a convex surface facing the object side and a plane surface facing the image side.

In yet another exemplary embodiment, the first lens group includes a first lens and a second lens; the first lens is a meniscus lens with negative refractive power and includes a convex surface facing the object side and a concave surface facing the image side; the second lens is a meniscus lens with positive refractive power and includes a convex surface facing the object side and a concave surface facing the image side; the first lens and the second lens are cemented; and the first lens and the second lens are arranged in order from the object side to the image side along the optical axis.

In another exemplary embodiment, the first lens group includes a first lens and a second lens, wherein the first lens is a biconvex lens with positive refractive power and includes a convex surface facing the object side and another convex surface facing the image side, the second lens is a meniscus lens with negative refractive power and includes a concave surface facing the object side and a convex surface facing the image side, the first lens and the second lens are cemented, and the first lens and the second lens are arranged in order from the object side to the image side along the optical axis; the second lens group is with negative refractive power and the third lens is a biconcave lens and further includes another concave surface facing the object side; the fourth lens is a biconvex lens with positive refractive power and further includes another convex surface facing the image side; the fifth lens group is with positive refractive power and the sixth lens is a meniscus lens with negative refractive power and further includes a convex surface facing the image side; the sixth lens group is with negative refractive power and includes a seventh lens and an eighth lens, wherein the seventh lens is a biconcave lens with negative refractive power and includes a concave surface facing the object side and another concave surface facing the image side, the eighth lens is a biconvex lens with positive refractive power and includes a convex surface facing the object side and another convex surface facing the image side, the seventh lens and the eighth lens are arranged in order from the object side to the image side along the optical axis, and the seventh lens and the eighth lens are cemented; the seventh lens group is with positive refractive power and includes a ninth lens, wherein the ninth lens is a biconvex lens with positive refractive power and includes a convex surface facing the object side and another convex surface facing the image side; and the eighth lens group is with positive refractive power and includes a tenth lens, wherein the tenth lens is a meniscus lens with positive refractive power and includes a convex surface facing the object side and a concave surface facing the image side.

In yet another exemplary embodiment, the second lens group includes a third lens and an eleventh lens, wherein the eleventh lens is disposed between the third lens and the third lens group; the second lens group is with negative refractive power; the third lens is a biconcave lens with negative refractive power and includes a concave surface facing the object side and another concave surface facing the image side; the eleventh lens is a biconvex lens with positive refractive power and includes a convex surface facing the object side and another convex surface facing the image side; and the third lens and the eleventh lens are cemented.

In another exemplary embodiment, the first lens group includes a first lens and a second lens, wherein the first lens is a meniscus lens with negative refractive power and includes a convex surface facing the object side and a concave surface facing the image side, the second lens is a biconvex lens with positive refractive power and includes a convex surface facing the object side and another convex surface facing the image side, the first lens and the second lens are cemented, and the first lens and the second lens are arranged in order from the object side to the image side along the optical axis; the fourth lens is a biconvex lens and further includes another convex surface facing the image side; the fifth lens group is with negative refractive power and the sixth lens is a meniscus lens with negative refractive power and further includes a convex surface facing the image side; the sixth lens group is with negative refractive power and includes a seventh lens and an eighth lens, wherein the seventh lens is a biconcave lens with negative refractive power and includes a concave surface facing the object side and another concave surface facing the image side, the eighth lens is a biconvex lens with positive refractive power and includes a convex surface facing the object side and another convex surface facing the image side, the seventh lens and the eighth lens are arranged in order from the object side to the image side along the optical axis, and the seventh lens and the eighth lens are cemented; the seventh lens group is with positive refractive power and includes a ninth lens, wherein the ninth lens is a biconvex lens with positive refractive power and includes a convex surface facing the object side and another convex surface facing the image side; and the eighth lens group is with positive refractive power and includes a tenth lens, wherein the tenth lens is a meniscus lens with positive refractive power and includes a convex surface facing the object side and a concave surface facing the image side.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
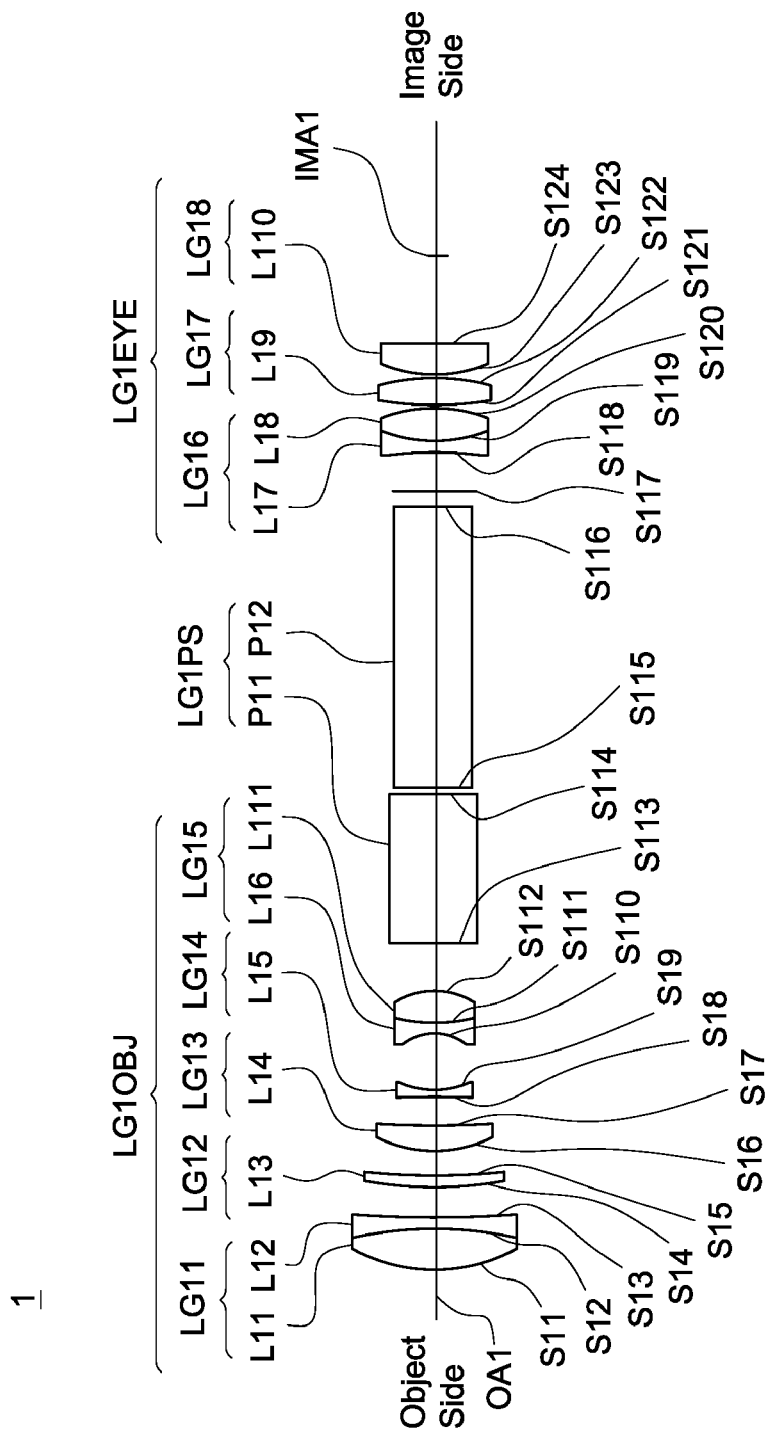
FIG. 1 is a lens layout diagram of an optical system in accordance with a first embodiment of the invention.
Figure 2:
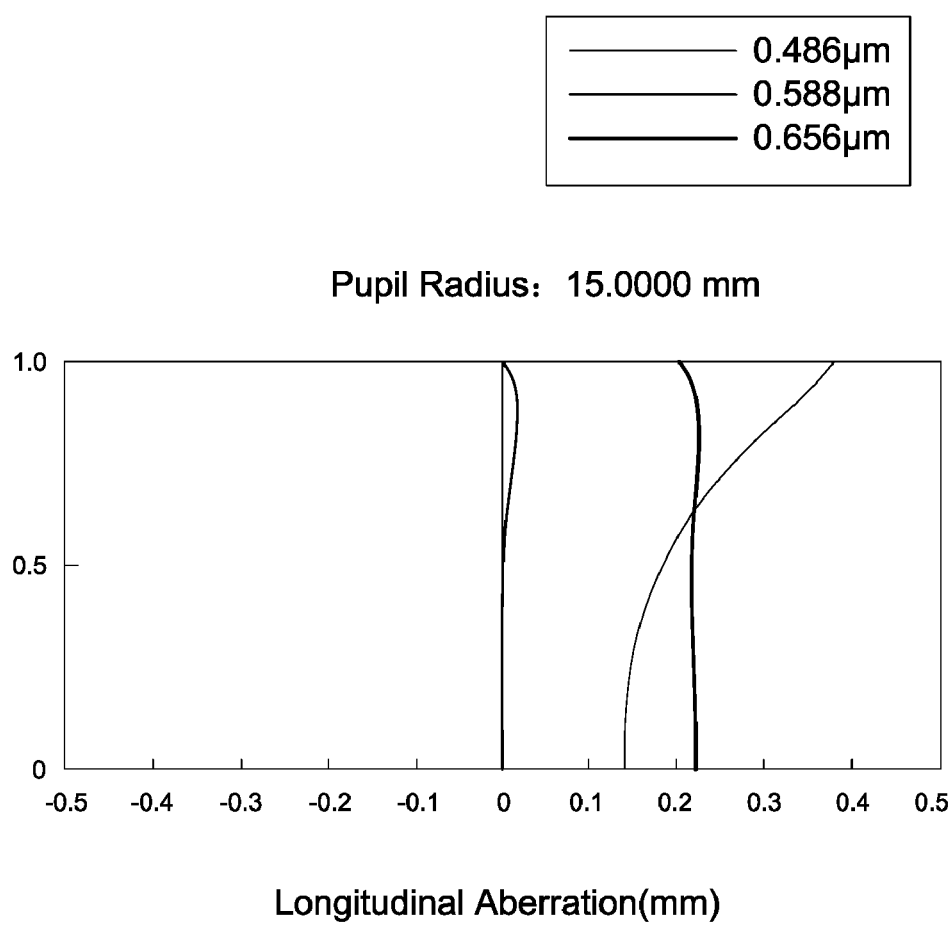
FIG. 2 depicts a longitudinal aberration diagram of the optical system under no shake condition in accordance with the first embodiment of the invention.
Figure 3:
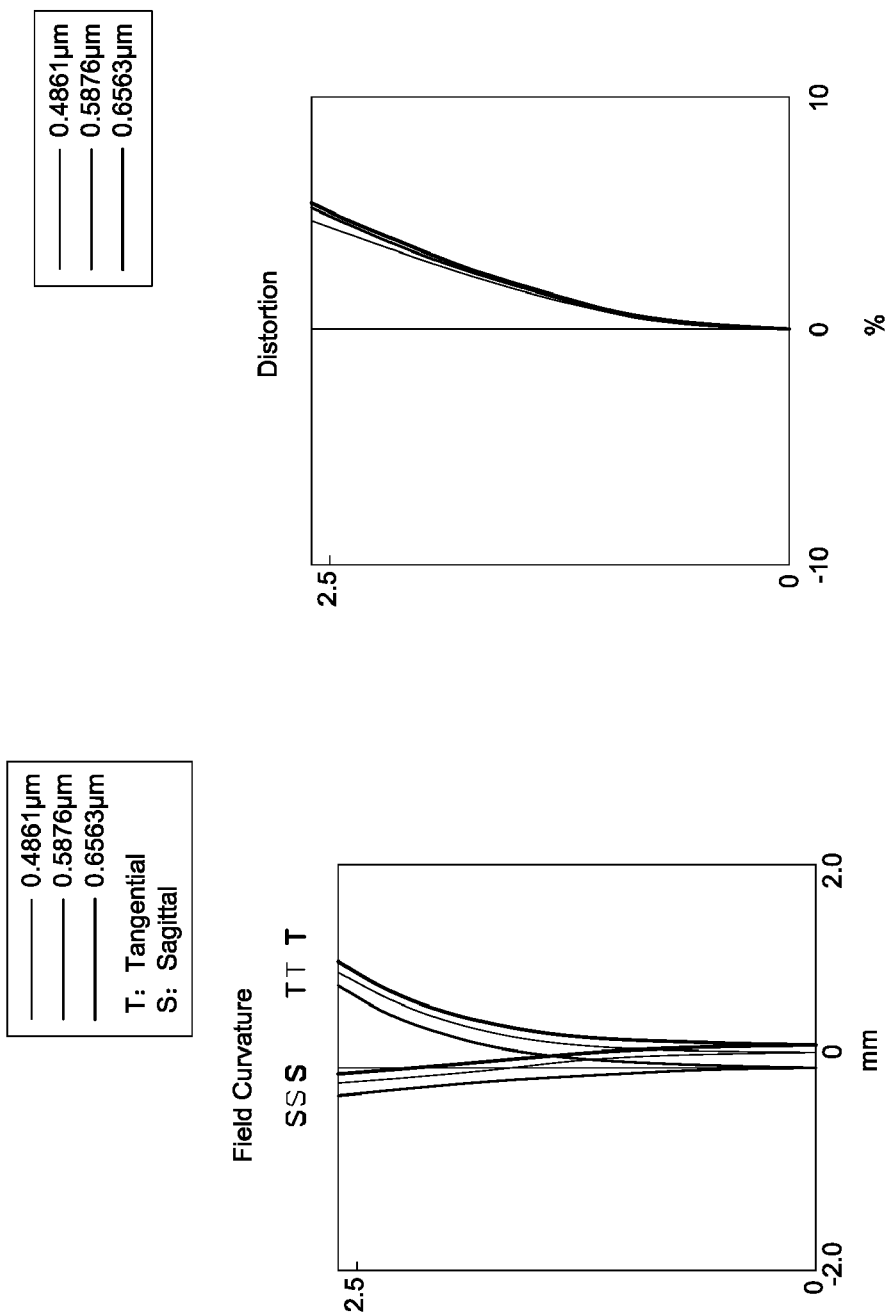
FIG. 3 is a field curvature and a distortion diagrams of the optical system under no shake condition in accordance with the first embodiment of the invention.
Figure 4:
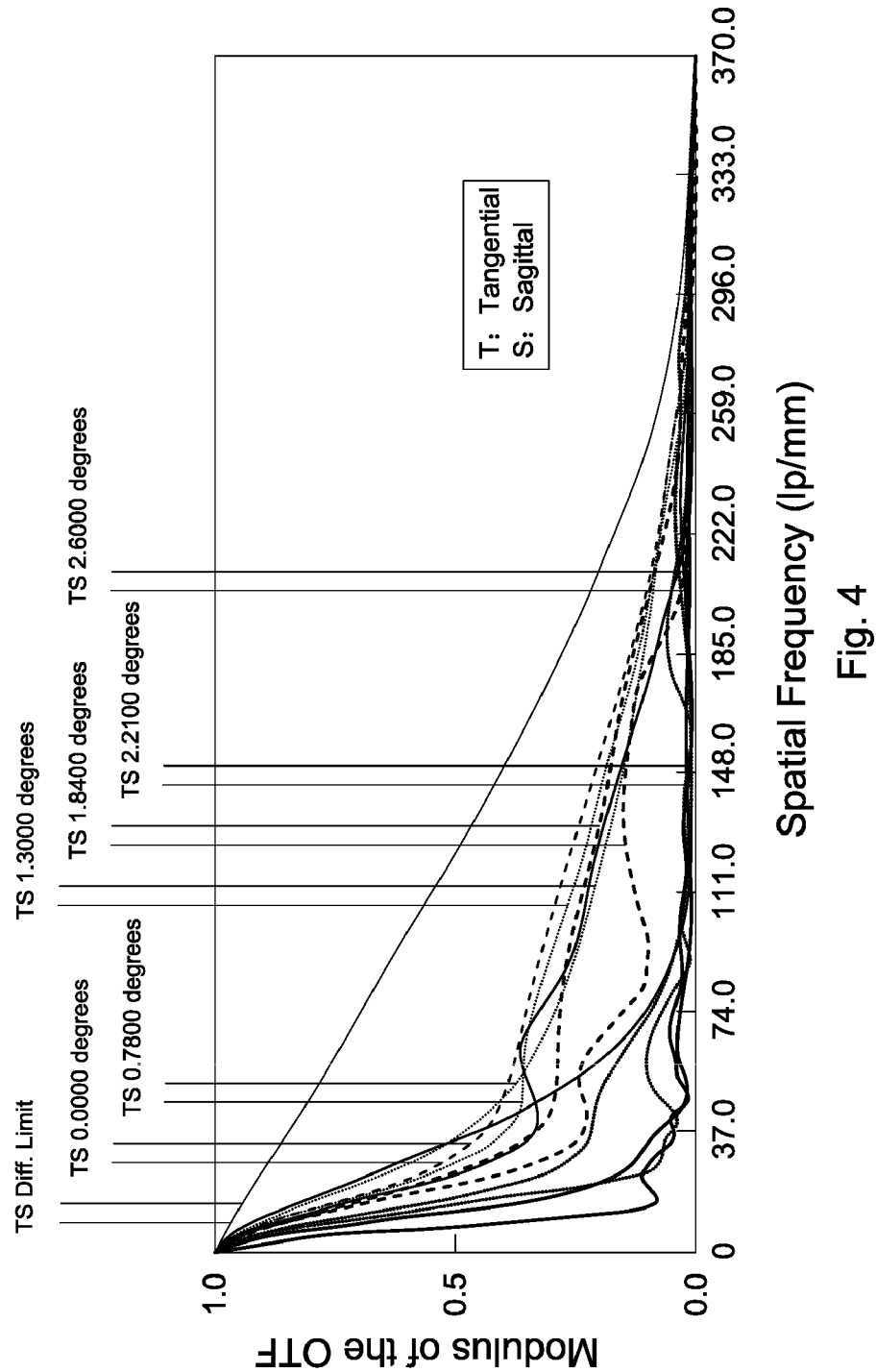
FIG. 4 is a modulation transfer function diagram of the optical system under no shake condition in accordance with the first embodiment of the invention.
Figure 5:
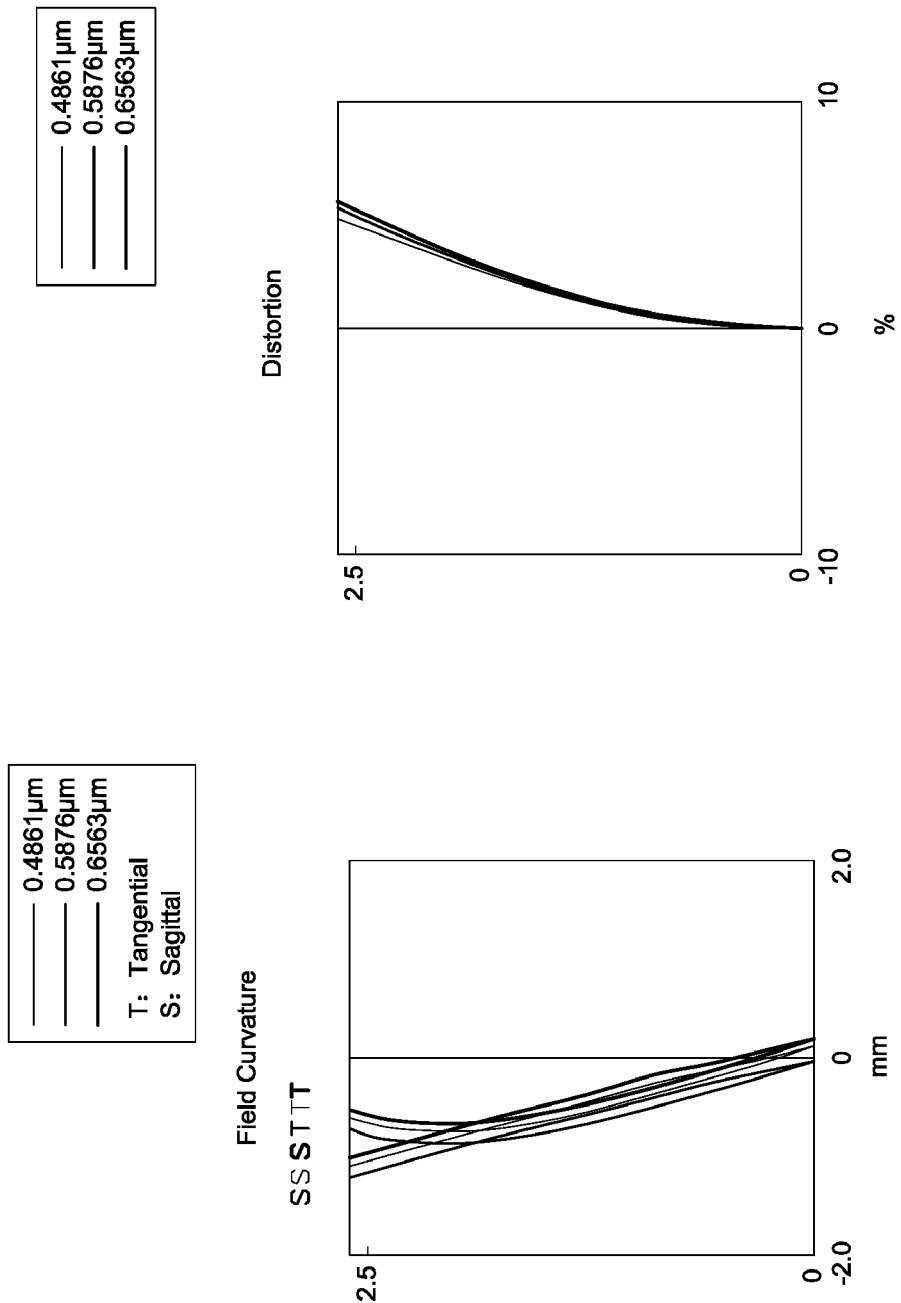
FIG. 5 is a field curvature and a distortion diagrams of the optical system under the condition of maximum shake compensation in accordance with the first embodiment of the invention.
Figure 6:
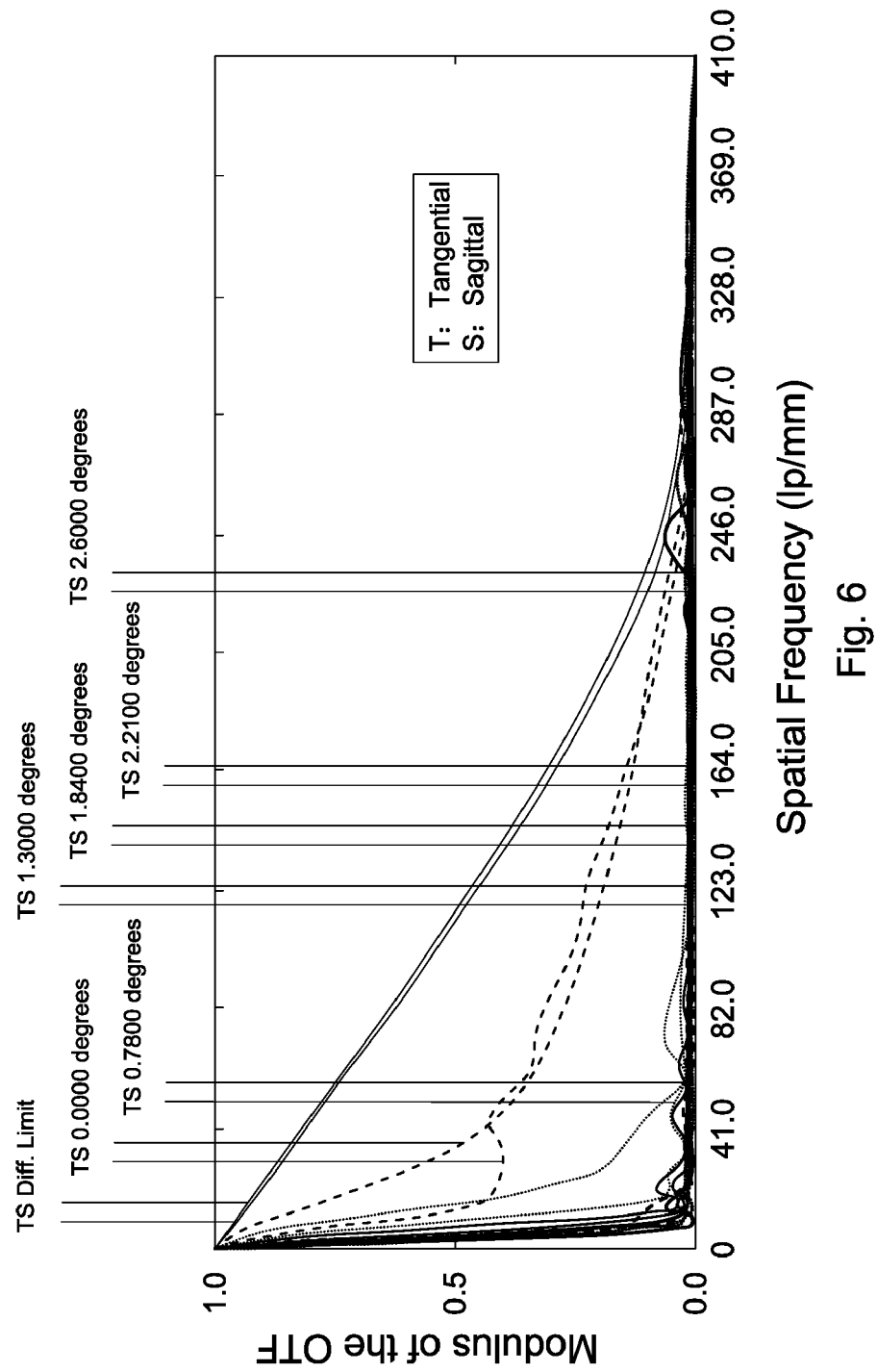
FIG. 6 is a modulation transfer function diagram of the optical system under the condition of maximum shake compensation in accordance with the first embodiment of the invention.

The following description is made for the purpose of illustrating the general principles of the invention and should not be taken in a limiting sense. The scope of the invention is best determined by reference to the appended claims.

The present invention provides an optical system including an objective lens module, an image inverting module, and an eyepiece module. The objective lens module, the image inverting module, and the eyepiece module are arranged in order from an object side to an image side along an optical axis. The objective lens module is with refractive power and includes a first lens group, a second lens group, a third lens group, a fourth lens group, and a fifth lens group. The first lens group, the second lens group, the third lens group, the fourth lens group, and the fifth lens group are arranged in order from the object side to the image side along the optical axis. The optical system satisfies at least one of the following conditions: $0.45 \leq LG4D/LG1D \leq 0.8$; $0.015 \text{ mm}^{-1} \leq 1/fG3 \leq 0.045 \text{ mm}^{-1}$; $0.045 \text{ mm}^{-1} \leq |1/fG4| \leq 0.07 \text{ mm}^{-1}$; $0.35 \leq |fG4/fG3| \leq 0.75$; $0.15 \leq fG1/f \leq 1.6$; wherein LG4D is an effective optical diameter of the fourth lens group, LG1D is an effective optical diameter of the first lens group, fG1 is an effective focal length of the first lens group, fG3 is an effective focal length of the third lens group, fG4 is an effective focal length of the fourth lens group, and f is an effective focal length of the objective lens module.

Referring to Table 1, Table 3, Table 5, Table 7, and Table 9, wherein Table 1, Table 3, Table 5, Table 7, and Table 9 show optical specification in accordance with a first, second, third, fourth, and fifth embodiments of the invention, respectively. FIG. 1, FIG. 7, FIG. 11, FIG. 17, and FIG. 23 are lens layout diagrams of an optical system in accordance with the first, second, third, fourth, and fifth embodiments of the invention, respectively.

The optical system 1 includes an objective lens module LG1OBJ, an image inverting module LG1PS, and an eyepiece module LG1EYE. The objective lens module LG1OBJ includes a first lens group LG11, a second lens group LG12, a third lens group LG13, a fourth lens group LG14, and a fifth lens group LG15. The first lens group LG11 includes a first lens L11 and a second lens L12. The second lens group LG12 includes a third lens L13. The third lens group LG13 includes a fourth lens L14. The fourth lens group LG14 includes a fifth lens L15. The fifth lens group LG15 includes a sixth lens L16 and an eleventh lens L111. The image inverting module LG1PS includes a first prism P11 and a second prism P12. The eyepiece module LG1EYE includes a sixth lens group LG16, a seventh lens group LG17, and an eighth lens group LG18. The sixth lens group LG16 includes a seventh lens L17 and an eighth lens L18. The seventh lens group LG17 includes a ninth lens L19. The eighth lens group LG18 includes a tenth lens L110. The optical system 2 includes an objective lens module LG2OBJ, an image inverting module LG2PS, and an eyepiece module LG2EYE. The objective lens module LG2OBJ includes a first lens group LG21, a second lens group LG22, a third lens group LG23, a fourth lens group LG24, and a fifth lens group LG25. The first lens group LG21 includes a first lens L21 and a second lens L22. The second lens group LG22 includes a third lens L23. The third lens group LG23 includes a fourth lens L24. The fourth lens group LG24 includes a fifth lens L25. The fifth lens group LG25 includes a sixth lens L26 and an eleventh lens L211. The image inverting module LG2PS includes a first prism P21 and a second prism P22. The eyepiece module LG2EYE includes a sixth lens group LG26, a seventh lens group LG27, and an eighth lens group LG28. The sixth lens group LG26 includes a seventh lens L27 and an eighth lens L28. The seventh lens group LG27 includes a ninth lens L29. The eighth lens group LG28 includes a tenth lens L210. The optical system 3 includes an objective lens module LG3OBJ, an image inverting module LG3PS, and an eyepiece module LG3EYE. The objective lens module LG3OBJ includes a first lens group LG31, a second lens group LG32, a third lens group LG33, a fourth lens group LG34, and a fifth lens group LG35. The first lens group LG31 includes a first lens L31 and a second lens L32. The second lens group LG32 includes a third lens L33. The third lens group LG33 includes a fourth lens L34. The fourth lens group LG34 includes a fifth lens L35. The fifth lens group LG35 includes a sixth lens L36 and an eleventh lens L311. The image inverting module LG3PS includes a first prism P31 and a second prism P32. The eyepiece module LG3EYE includes a sixth lens group LG36, a seventh lens group LG37, and an eighth lens group LG38. The sixth lens group LG36 includes a seventh lens L37 and an eighth lens L38. The seventh lens group LG37 includes a ninth lens L39. The eighth lens group LG38 includes a tenth lens L310. The optical system 4 includes an objective lens module LG4OBJ, an image inverting module LG4PS, and an eyepiece module LG4EYE. The objective lens module LG4OBJ includes a first lens group LG41, a second lens group LG42, a third lens group LG43, a fourth lens group LG44, and a fifth lens group LG45. The first lens group LG41 includes a first lens L41 and a second lens L42. The second lens group LG42 includes a third lens L43 and an eleventh lens L411. The third lens group LG43 includes a fourth lens L44. The fourth lens group LG44 includes a fifth lens L45. The fifth lens group LG45 includes a sixth lens L46. The image inverting module LG4PS includes a first prism P41 and a second prism P42. The eyepiece module LG4EYE includes a sixth lens group LG46, a seventh lens group LG47, and an eighth lens group LG48. The sixth lens group LG46 includes a seventh lens L47 and an eighth lens L48. The seventh lens group LG47 includes a ninth lens L49. The eighth lens group LG48 includes a tenth lens L410. The optical system 5 includes an objective lens module LG5OBJ, an image inverting module LG5PS, and an eyepiece module LG5EYE. The objective lens module LG5OBJ includes a first lens group LG51, a second lens group LG52, a third lens group LG53, a fourth lens group LG54, and a fifth lens group LG55. The first lens group LG51 includes a first lens L51 and a second lens L52. The second lens group LG52 includes a third lens L53. The third lens group LG53 includes a fourth lens L54. The fourth lens group LG54 includes a fifth lens L55. The fifth lens group LG55 includes a sixth lens L56 and an eleventh lens L511. The image inverting module LG5PS includes a first prism P51 and a second prism P52. The eyepiece module LG5EYE includes a sixth lens group LG56, a seventh lens group LG57, and an eighth lens group LG58. The sixth lens group LG56 includes a seventh lens L57 and an eighth lens L58. The seventh lens group LG57 includes a ninth lens L59. The eighth lens group LG58 includes a tenth lens L510.

The first lens groups LG11, LG21, LG31, LG41, LG51 are with positive refractive power. The first lenses L11, L21, L31, L41, L51 are made of glass material, wherein the object side surfaces S11, S21, S31, S41, S51 are convex surfaces and both of the object side surfaces S11, S21, S31, S41, S51 and image side surfaces S12, S22, S32, S42, S52 are spherical surfaces. The second lenses L12, L22, L32, L42, L52 are made of glass material, wherein both of the object side surfaces S12, S22, S32, S42, S52 and image side surfaces S13, S23, S33, S43, S53 are spherical surfaces. The first lenses L11, L21, L31, L41, L51 are cemented with the second lenses L12, L22, L32, L42, L52, respectively. The second lens groups LG12, LG22, LG32, LG42, LG52 can move along the optical axes OA1, OA2, OA3, OA4, OA5, so that the optical systems 1, 2, 3, 4, 5 can achieve focus. The third lenses L13, L23, L33, L43, L53 are made of glass material, wherein the image side surfaces S15, S25, S35, S45, S55 are concave surfaces and both of the object side surfaces S14, S24, S34, S44, S54 and image side surfaces S15, S25, S35, S45, S55 are spherical surfaces. The third lens groups LG13, LG23, LG33, LG43, LG53 are with positive refractive power. The fourth lenses L14, L24, L34, L44, L54 are with positive refractive power and made of glass material, wherein the object side surfaces S16, S26, S36, S46, S56 are convex surfaces and both of the object side surfaces S16, S26, S36, S46, S56 and image side surfaces S17, S27, S37, S47, S57 are spherical surfaces. The fourth lens groups LG14, LG24, LG34, LG44, LG54 are with negative refractive power. The fourth lens groups LG14, LG24, LG34, LG44, LG54 can move along the direction perpendicular to the optical axes OA1, OA2, OA3, OA4, OA5, so that the optical systems 1, 2, 3, 4, 5 can achieve optical image stabilization. The fifth lenses L15, L25, L35, L45, L55 are biconcave lenses with negative refractive power and made of glass material, wherein the object side surfaces S18, S28, S38, S49, S58 are concave surfaces, the image side surfaces S19, S29, S39, S410, S59 are concave surfaces, and both of the object side surfaces S18, S28, S38, S49, S58 and image side surfaces S19, S29, S39, S410, S59 are spherical surfaces. The sixth lenses L16, L26, L36, L46, L56 are with negative refractive power and made of glass material, wherein the object side surfaces S110, S210, S310, S411, S510 are concave surfaces and both of the object side surfaces S110, S210, S310, S411, S510 and image side surfaces S111, S211, S311, S412, S511 are spherical surfaces. The first prisms P11, P21, P31, P41, P51 are made of glass material, wherein the object side surfaces S113, S213, S313, S413, S514 are plane surfaces and the image side surfaces S114, S214, S314, S414, S515 are plane surfaces. The second prisms P12, P22, P32, P42, P52 are made of glass material, wherein the object side surfaces S115, S215, S315, S415, S516 are plane surfaces and the image side surfaces S116, S216, S316, S416, S517 are plane surfaces. The seventh lenses L17, L27, L37, L47, L57 are biconcave lenses with negative refractive power and made of glass material, wherein the object side surfaces S118, S218, S318, S418, S519 are concave surfaces, the image side surfaces S119, S219, S319, S419, S520 are concave surfaces, and both of the object side surfaces S118, S218, S318, S418, S519 and image side surfaces S119, S219, S319, S419, S520 are spherical surfaces. The eighth lenses L18, L28, L38, L48, L58 are biconvex lenses with positive refractive power and made of glass material, wherein the object side surfaces S119, S219, S319, S419, S520 are convex surfaces, the image side surfaces S120, S220, S320, S420, S521 are convex surfaces, and both of the object side surfaces S119, S219, S319, S419, S520 and image side surfaces S120, S220, S320, S420, S521 are spherical surfaces. The seventh lenses L17, L27, L37, L47, L57 and the eighth lenses L18, L28, L38, L48, L58 are cemented, respectively. The seventh lens groups LG17, LG27, LG37, LG47, LG57 are with positive refractive power. The ninth lenses L19, L29, L39, L49, L59 are biconvex lenses with positive refractive power and made of glass material, wherein the object side surfaces S121, S221, S321, S421, S522 are convex surfaces, the image side surfaces S122, S222, S322, S422, S523 are convex surfaces, and both of the object side surfaces S121, S221, S321, S421, S522 and image side surfaces S122, S222, S322, S422, S523 are spherical surfaces. The eighth lens groups LG18, LG28, LG38, LG48, LG58 are with positive refractive power. The tenth lenses L110, L210, L310, L410, L510 are with positive refractive power and made of glass material, wherein the object side surfaces S123, S223, S323, S423, S524 are convex surfaces and both of the object side surfaces S123, S223, S323, S423, S524 and image side surfaces S124, S224, S324, S424, S525 are spherical surfaces.

The above-mentioned image inverting module can rotate the direction of the image from the objective lens module. For example, if the image from the objective lens module is an inverted image, the image can be rotated into an upright image after passing through the image inverting module, so that the image inverting module can also be called an erect optical module.

In addition, the optical systems 1, 2, 3, 4, 5 satisfy at least one of the following conditions:

$$0.45 \leq LG4D/LG1D \leq 0.8; \quad (1)$$

$$0.015 \text{ mm}^{-1} \leq 1/fG3 \leq 0.045 \text{ mm}^{-1}; \quad (2)$$

$$0.045 \text{ mm}^{-1} \leq |1/fG4| \leq 0.07 \text{ mm}^{-1}; \quad (3)$$

$$0.35 \leq |fG4/fG3| \leq 0.75; \quad (4)$$

$$0.15 \leq fG1/f \leq 1.6; \quad (5)$$

wherein LG1D is an effective optical diameter of the first lens groups LG11, LG21, LG31, LG41, LG51 for the first to fifth embodiments, LG4D is an effective optical diameter of the fourth lens groups LG14, LG24, LG34, LG44, LG54 for the first to fifth embodiments, fG1 is an effective focal length of the first lens groups LG11, LG21, LG31, LG41, LG51 for the first to fifth embodiments, fG3 is an effective focal length of the third lens groups LG13, LG23, LG33, LG43, LG53 for the first to fifth embodiments, fG4 is an effective focal length of the fourth lens groups LG14, LG24, LG34, LG44, LG54 for the first to fifth embodiments, and f is an effective focal length of the objective lens module LG1OBJ, LG2OBJ, LG3OBJ, LG4OBJ, LG5OBJ for the first to fifth embodiments. With the optical systems 1, 2, 3, 4, 5 satisfying at least one of the above conditions (1)-(5), the aberration can be effectively corrected and the chromatic aberration can be effectively corrected.

The first lens group is formed by cementing the first lens and the second lens which can effectively correct the axial chromatic aberration. The third lens group has a large refractive power (positive) which can effectively improve the deflection ability of light, so that the light enters the third lens group can quickly converge to the fourth lens group which has a smaller diameter. The diameter of the fourth lens group is only half of the first lens group making it smaller in volume and miniaturization, and its optical power is larger (negative) which can make the light incident on the fourth lens group quickly diverge and achieve optical image stabilization as moving and the required moving distance for optical image stabilization is shorter and has a larger compensation angle. The optical power is the reciprocal of the effective focal length and the large optical power refers to a short effective focal length.

A detailed description of an optical system in accordance with a first embodiment of the invention is as follows. Referring to FIG. 1, the optical system 1 includes an objective lens module LG1OBJ, an image inverting module LG1PS, and an eyepiece module LG1EYE, all of which are arranged in order from an object side to an image side along an optical axis OA1. The objective lens module LG1OBJ includes a first lens groups LG11, a second lens group LG12, a third lens group LG13, a fourth lens group LG14, and a fifth lens group LG15, all of which are arranged in order from the object side to the image side along the optical axis OA1. The first lens groups LG11 includes a first lens L11 and a second lens L12, both of which are arranged in order from the object side to the image side along the optical axis OA1. The first lens L11 and the second lens L12 are cemented. The second lens group LG12 includes a third lens L13. The third lens group LG13 includes a fourth lens L14. The fourth lens group LG14 includes a fifth lens L15. The fifth lens group LG15 includes a sixth lens L16 and an eleventh lens L111, both of which are arranged in order from the object side to the image side along the optical axis OA1. The sixth lens L16 and the eleventh lens L110 are cemented. The image inverting module LG1PS includes a first prism P11 and a second prism P12, both of which are arranged in order from the object side to the image side along the optical axis OA1. The eyepiece module LG1EYE includes a sixth lens group LG16, a seventh lens group LG17, and an eighth lens group LG18, all of which are arranged in order from the object side to the image side along the optical axis OA1. The sixth lens group LG16 includes a seventh lens L17 and an eighth lens L18, both of which are arranged in order from the object side to the image side along the optical axis OA1. The seventh lens L17 and the eighth lens L18 are cemented. The seventh lens group LG17 includes a ninth lens L19. The eighth lens group LG18 includes a tenth lens L110. In operation, a light from the object side sequentially passes through the objective lens module LG1OBJ and the image inverting module LG1PS to form an image on a focal plane S117 and then passes through the eyepiece module LG1EYE to form an image on an image plane IMA1. The second lens group LG12 can move along the optical axis OA1, so that the optical system 1 can achieve focus. The fourth lens group LG14 can move along the direction perpendicular to the optical axis OA1 within a range of 0.6 mm, so that the optical system 1 can achieve optical image stabilization, wherein the compensation angle for the shake of the optical axis can reach ±0.8 degrees.

According to the foregoing, wherein: the first lens L11 is a biconvex lens with positive refractive power, wherein the image side surface S12 is a convex surface; the second lens L12 is a biconcave lens with negative refractive power, wherein the object side surface S12 is a concave surface and the image side surface S13 is a concave surface; the second lens group LG12 is with positive refractive power and the third lens L13 is a meniscus lens with positive refractive power, wherein the object side surface S14 of the third lens L13 is a convex surface; the fourth lens L14 is a meniscus lens, wherein the image side surface S17 is a concave surface; the fifth lens group LG15 is with negative refractive power, the sixth lens L16 is a biconcave lens, and the eleventh lens L111 is a biconvex lens with positive refractive power, wherein the image side surface S111 of the sixth lens L16 is a concave surface, the object side surface S111 of the eleventh lens L111 is a convex surface, the image side surface S112 of the eleventh lens L111 is a convex surface, and the sixth lens L16 and the eleventh lens L111 are cemented; the sixth lens group LG16 is with positive refractive power; and the tenth lens L110 is a plano-convex lens, wherein the image side surface S124 is a plane surface. With the above design of the objective lens module LG1OBJ, image inverting module LG1PS, eyepiece module LG1EYE, and at least one of the conditions (1)-(5) satisfied, the optical system 1 can have an effective corrected aberration and an effective corrected chromatic aberration.

Table 1 shows the optical specification of the optical system 1 in FIG. 1.

TABLE 1

| Surface Number | Radius of Curvature (mm) | Thickness (mm) | Nd | Vd | Effective Focal Length (mm) | Remark |
|---|---|---|---|---|---|---|
| S11 | 31.191 | 7.5 | 1.5639 | 60.765 | 39.625 | L11 |
| S12 | −71.943 | 2 | 1.7283 | 28.324 | −70.144 | L12 |
| S13 | 178.237 | 5.5 | | | | |
| S14 | 64.018 | 2.21 | 1.6516 | 58.416 | 180.357 | L13 |
| S15 | 138.698 | 4.5 | | | | |
| S16 | 25.014 | 4.5 | 1.6385 | 55.472 | 43.41 | L14 |
| S17 | 238.355 | 5.19 | | | | |
| S18 | −109.992 | 1.25 | 1.7725 | 49.613 | −17.169 | L15 |
| S19 | 15.156 | 10.185 | | | | |
| S110 | −10.59 | 2 | 1.5891 | 61.246 | −13.123 | L16 |
| S111 | 30.645 | 5.57 | 1.5891 | 61.246 | 17.054 | L117 |
| S112 | −13.941 | 8.71 | | | | |
| S113 | ∞ | 27.142 | 1.5688 | 56.06 | | P11 |
| S114 | ∞ | 0.8 | | | | |
| S115 | ∞ | 51 | 1.5688 | 56.06 | | P12 |
| S116 | ∞ | 2.5 | | | | |
| S117 | ∞ | 7.29 | | | | Focal Plane |
| S118 | −50.132 | 1.84 | 1.946 | 17.942 | −16.69 | L17 |
| S119 | 23.457 | 6.27 | 1.7015 | 41.141 | 17.693 | L18 |
| S120 | −23.457 | 0.35 | | | | |
| S121 | 59.879 | 4.97 | 1.6385 | 55.472 | 38.62 | L19 |
| S122 | −40.574 | 0.25 | — | — | — | |
| S123 | 21.773 | 5.96 | 1.6385 | 55.472 | 34.097 | L110 |
| S124 | ∞ | 15.32 | | | | |

Table 2 shows the parameters and condition values for conditions (1)-(5) in accordance with the optical system 1 of the first embodiment. It can be seen from Table 2 that the optical system 1 of the first embodiment satisfies the conditions (1)-(5). The preferred embodiment of the present invention can be achieved when the refractive power and surface shape of each lens comply with Table 1 and conditions (1)-(5) are satisfied.

TABLE 2

| LG4D | 14.2 mm | LG1D | 30 mm | fG1 | 39.625 mm |
|---|---|---|---|---|---|
| fG4 | −17.169 mm | fG3 | 43.41 mm | f | 159.617 mm |
| LG4D/LG1D | 0.47 | 1/fG3 | 0.023 mm$^{-1}$ | |1/fG4| | 0.058 mm$^{-1}$ |
| |fG4/fG3| | 0.40 | fG1/f | 0.248 | | |

In addition, the optical system 1 of the first embodiment can meet the requirements of optical performance as seen in FIGS. 2-6. It can be seen from FIG. 2 that the longitudinal aberration in the optical system 1 of the first embodiment under no shake condition ranges from 0 mm to 0.4 mm. It can be seen from FIG. 3 that the field curvature of tangential direction and sagittal direction and distortion in the optical system 1 of the first embodiment under no shake condition ranges from −0.4 mm to 1.2 mm and 0% to 6%, respectively. It can be seen from FIG. 4 that the modulation transfer function of tangential direction and sagittal direction in the optical system 1 of the first embodiment under no shake condition ranges from 0 to 1.0. It can be seen from FIG. 5 that the field curvature of tangential direction and sagittal direction and distortion in the optical system 1 of the first embodiment under the condition of maximum shake compensation ranges from −1.2 mm to 0.2 mm and 0% to 6%, respectively. It can be seen from FIG. 6 that the modulation transfer function of tangential direction and sagittal direction in the optical system 1 of the first embodiment under the condition of maximum shake compensation ranges from 0 to 1.0. It is obvious that the longitudinal aberration, the field curvature and the distortion of the optical system 1 of the first embodiment under no shake condition or the condition of maximum shake compensation can be corrected effectively and the image resolution can meet the requirements. Therefore, the optical system 1 of the first embodiment is capable of good optical performance.

Figure 7:
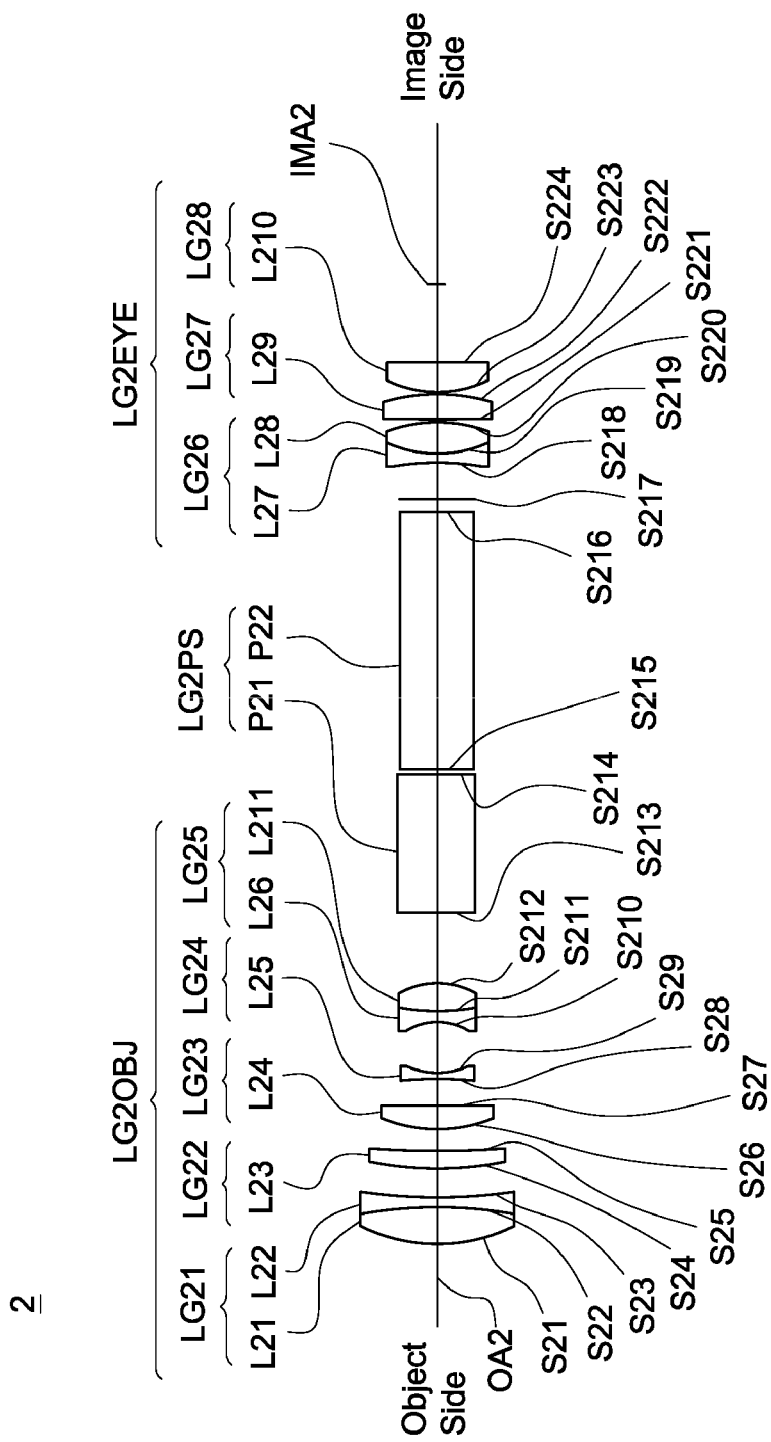
FIG. 7 is a lens layout diagram of an optical system in accordance with a second embodiment of the invention.

A detailed description of an optical system in accordance with a second embodiment of the invention is as follows. Referring to FIG. 7, the optical system 2 includes an objective lens module LG2OBJ, an image inverting module LG2PS, and an eyepiece module LG2EYE, all of which are arranged in order from an object side to an image side along an optical axis OA2. The objective lens module LG2OBJ includes a first lens groups LG21, a second lens group LG22, a third lens group LG23, a fourth lens group LG24, and a fifth lens group LG25, all of which are arranged in order from the object side to the image side along the optical axis OA2. The first lens groups LG21 includes a first lens L21 and a second lens L22, both of which are arranged in order from the object side to the image side along the optical axis OA2. The first lens L21 and the second lens L22 are cemented. The second lens group LG22 includes a third lens L23. The third lens group LG23 includes a fourth lens L24. The fourth lens group LG24 includes a fifth lens L25. The fifth lens group LG25 includes a sixth lens L26 and an eleventh lens L211, both of which are arranged in order from the object side to the image side along the optical axis OA2. The sixth lens L26 and the eleventh lens L211 are cemented. The image inverting module LG2PS includes a first prism P21 and a second prism P22, both of which are arranged in order from the object side to the image side along the optical axis OA2. The eyepiece module LG2EYE includes a sixth lens group LG26, a seventh lens group LG27, and an eighth lens group LG28, all of which are arranged in order from the object side to the image side along the optical axis OA2. The sixth lens group LG26 includes a seventh lens L27 and an eighth lens L28, both of which are arranged in order from the object side to the image side along the optical axis OA2. The seventh lens L27 and the eighth lens L28 are cemented. The seventh lens group LG27 includes a ninth lens L29. The eighth lens group LG28 includes a tenth lens L210. In operation, a light from the object side sequentially passes through the objective lens module LG2OBJ and the image inverting module LG2PS to form an image on a focal plane S217 and then passes through the eyepiece module LG2EYE to form an image on an image plane IMA2. The second lens group LG22 can move along the optical axis OA2, so that the optical system 2 can achieve focus. The fourth lens group LG24 can move along the direction perpendicular to the optical axis OA2 within a range of 0.6 mm, so that the optical system 2 can achieve optical image stabilization, wherein the compensation angle for the shake of the optical axis can reach ±0.8 degrees.

According to the foregoing, wherein: the first lens L21 is a biconvex lens with positive refractive power, wherein the image side surface S22 is a convex surface; the second lens L22 is a biconcave lens with negative refractive power, wherein the object side surface S22 is a concave surface and the image side surface S23 is a concave surface; the second lens group LG22 is with positive refractive power and the third lens L23 is a meniscus lens with positive refractive power, wherein the object side surface S24 of the third lens L23 is a convex surface; the fourth lens L24 is a meniscus lens, wherein the image side surface S27 is a concave surface; the fifth lens group LG25 is with negative refractive power, the sixth lens L26 is a biconcave lens, and the eleventh lens L211 is a biconvex lens with positive refractive power, wherein the image side surface S211 of the sixth lens L26 is a concave surface, the object side surface S211 of the eleventh lens L211 is a convex surface, and the image side surface S212 of the eleventh lens L211 is a convex surface; the sixth lens L26 and the eleventh lens L211 are cemented; the sixth lens group LG26 is with positive refractive power; and the tenth lens L210 is a plano-convex lens, wherein the image side surface S224 is a plane surface. With the above design of the objective lens module LG2OBJ, image inverting module LG2PS, eyepiece module LG2EYE, and at least one of the conditions (1)-(5) satisfied, the optical system 2 can have an effective corrected aberration and an effective corrected chromatic aberration.

Table 3 shows the optical specification of the optical system 2 in FIG. 7.

TABLE 3

| Surface Number | Radius of Curvature (mm) | Thickness (mm) | Nd | Vd | Effective Focal Length (mm) | Remark |
|---|---|---|---|---|---|---|
| S21 | 32.93 | 7.5 | 1.5639 | 60.765 | 43.473 | L21 |
| S22 | −88.039 | 2 | 1.7283 | 28.324 | −75.124 | L22 |
| S23 | 145.899 | 5.5 | | | | |
| S24 | 68.338 | 3.28 | 1.6516 | 58.416 | 186.386 | L23 |
| S25 | 153.311 | 4.5 | | | | |
| S26 | 27.485 | 4.5 | 1.6385 | 55.472 | 44.058 | L24 |
| S27 | 1117.617 | 5.19 | | | | |
| S28 | −103.697 | 1.25 | 1.7725 | 49.613 | −19.56 | L25 |
| S29 | 17.78 | 10.185 | | | | |
| S210 | −11.124 | 2 | 1.5891 | 61.246 | −13.988 | L26 |
| S211 | 33.913 | 5.57 | 1.5891 | 61.246 | 18.094 | L211 |
| S212 | −14.6 | 13.975 | | | | |
| S213 | ∞ | 27.142 | 1.5688 | 56.06 | | P21 |
| S214 | ∞ | 0.8 | | | | |
| S215 | ∞ | 51 | 1.5688 | 56.06 | | P22 |
| S216 | ∞ | 2.5 | | | | |
| S217 | ∞ | 7.17 | | | | Focal Plane |
| S218 | −57.163 | 1.84 | 1.946 | 17.942 | −17.307 | L27 |
| S219 | 23.301 | 6.27 | 1.7015 | 41.141 | 17.582 | L28 |
| S220 | −23.301 | 0.35 | | | | |
| S221 | 173.746 | 4.97 | 1.6385 | 55.472 | 46.519 | L29 |
| S222 | −35.43 | 0.25 | | | | |
| S223 | 20.107 | 5.96 | 1.6385 | 55.472 | 31.489 | L210 |
| S224 | ∞ | 15.41 | | | | |

Table 4 shows the parameters and condition values for conditions (1)-(5) in accordance with the optical system 2 of the second embodiment. It can be seen from Table 4 that the optical system 2 of the second embodiment satisfies the conditions (1)-(5). The preferred embodiment of the present invention can be achieved when the refractive power and surface shape of each lens comply with Table 3 and conditions (1)-(5) are satisfied.

TABLE 4

| LG4D | 14.2 mm | LG1D | 30 mm | fG1 | 43.473 mm |
|---|---|---|---|---|---|
| fG4 | −19.56 mm | fG3 | 44.058 mm | f | 160.847 mm |
| LG4D/LG1D | 0.47 | 1/fG3 | 0.023 mm$^{-1}$ | |1/fG4| | 0.051 mm$^{-1}$ |
| |fG4/fG3| | 0.45 | fG1/f | 0.270 | | |

Figure 8:
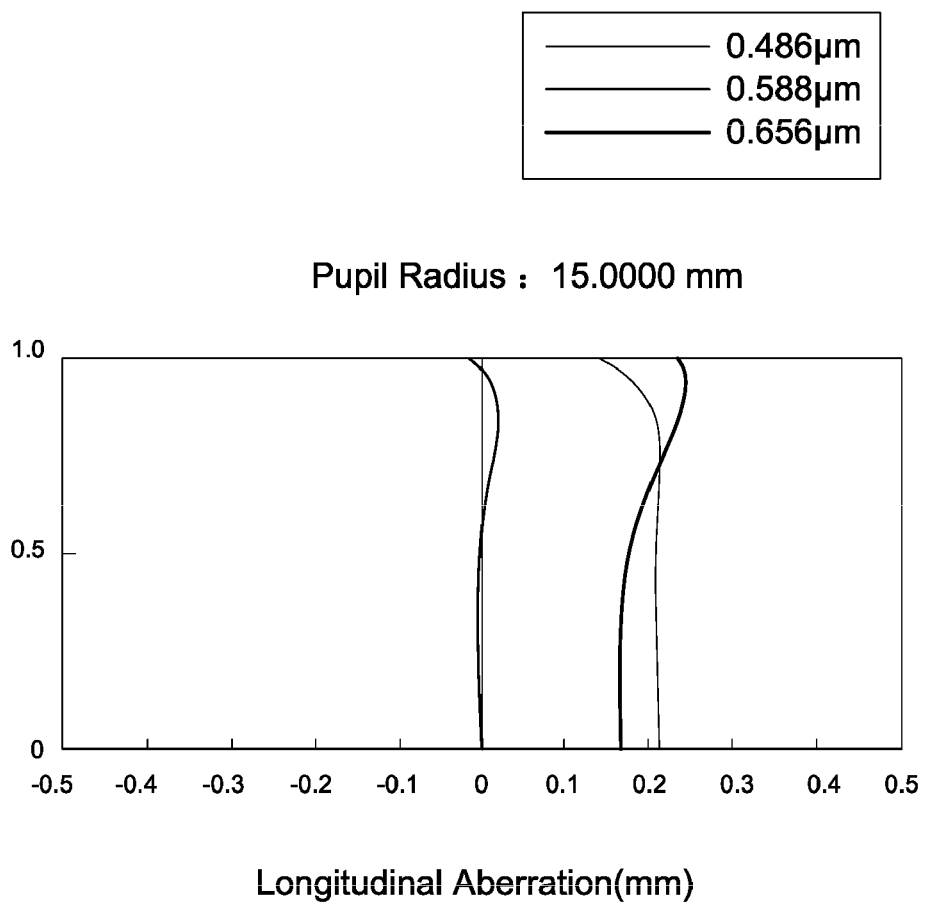
FIG. 8 depicts a longitudinal aberration diagram of the optical system under no shake condition in accordance with the second embodiment of the invention.
Figure 9:
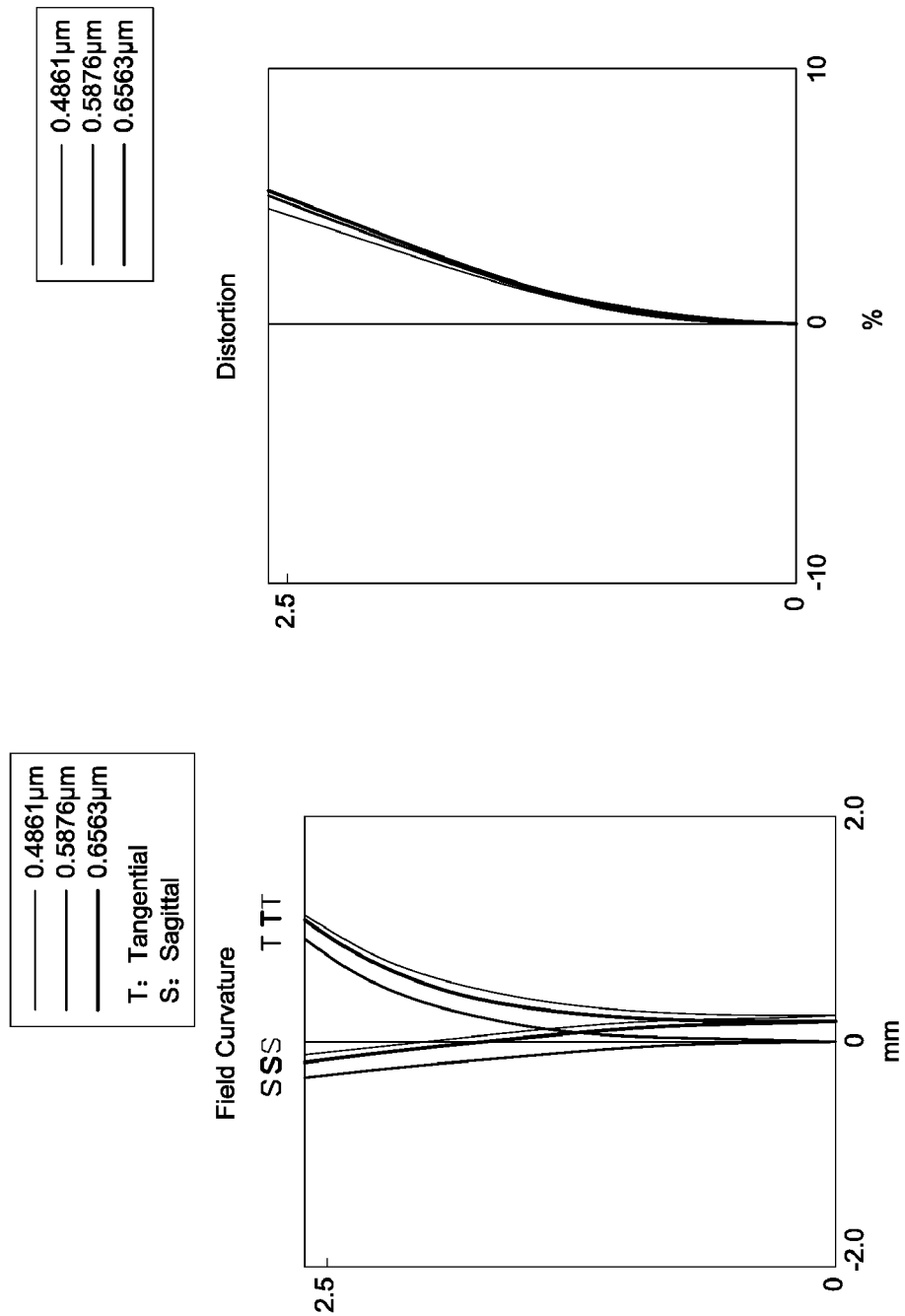
FIG. 9 is a field curvature and a distortion diagrams of the optical system under no shake condition in accordance with the second embodiment of the invention.
Figure 10:
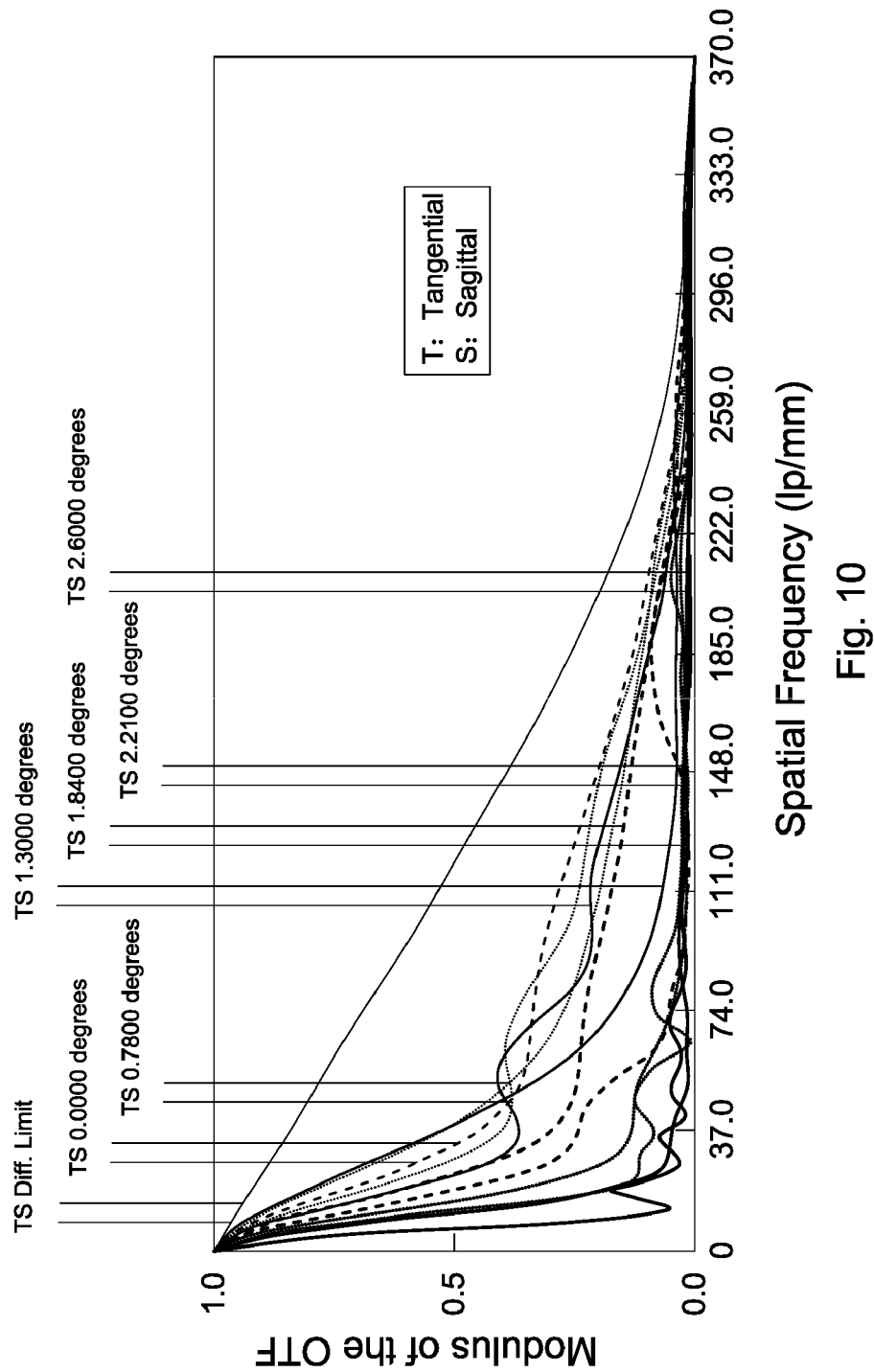
FIG. 10 is a modulation transfer function diagram of the optical system under no shake condition in accordance with the second embodiment of the invention.

In addition, the optical system 2 of the second embodiment can meet the requirements of optical performance as seen in FIGS. 8-10. It can be seen from FIG. 8 that the longitudinal aberration in the optical system 2 of the second embodiment under no shake condition ranges from −0.05 mm to 0.25 mm. It can be seen from FIG. 9 that the field curvature of tangential direction and sagittal direction and distortion in the optical system 2 of the second embodiment under no shake condition ranges from −0.4 mm to 1.2 mm and 0% to 6%, respectively. It can be seen from FIG. 10 that the modulation transfer function of tangential direction and sagittal direction in the optical system 2 of the second embodiment under no shake condition ranges from 0 to 1.0. The field curvature, distortion, and modulation transfer function diagrams in the optical system 2 of the second embodiment under the condition of maximum shake compensation are approximate to that of the first embodiment, so that the figures are omitted and its optical performance can also meet the requirements. It is obvious that the longitudinal aberration, the field curvature and the distortion of the optical system 2 of the second embodiment under no shake condition or the condition of maximum shake compensation can be corrected effectively and the image resolution can meet the requirements. Therefore, the optical system 2 of the second embodiment is capable of good optical performance.

Figure 11:
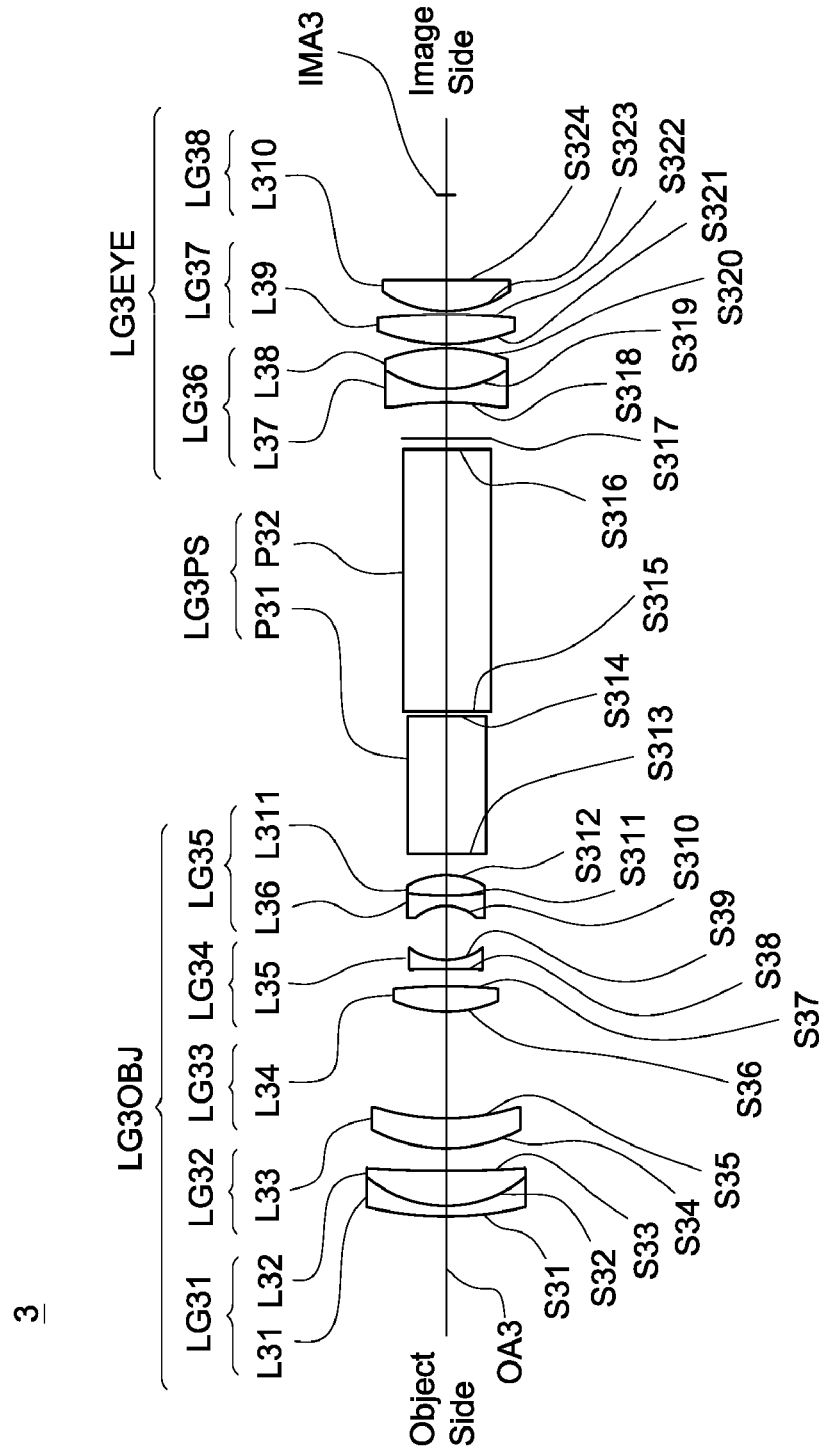
FIG. 11 is a lens layout diagram of an optical system in accordance with a third embodiment of the invention.
Figure 12:
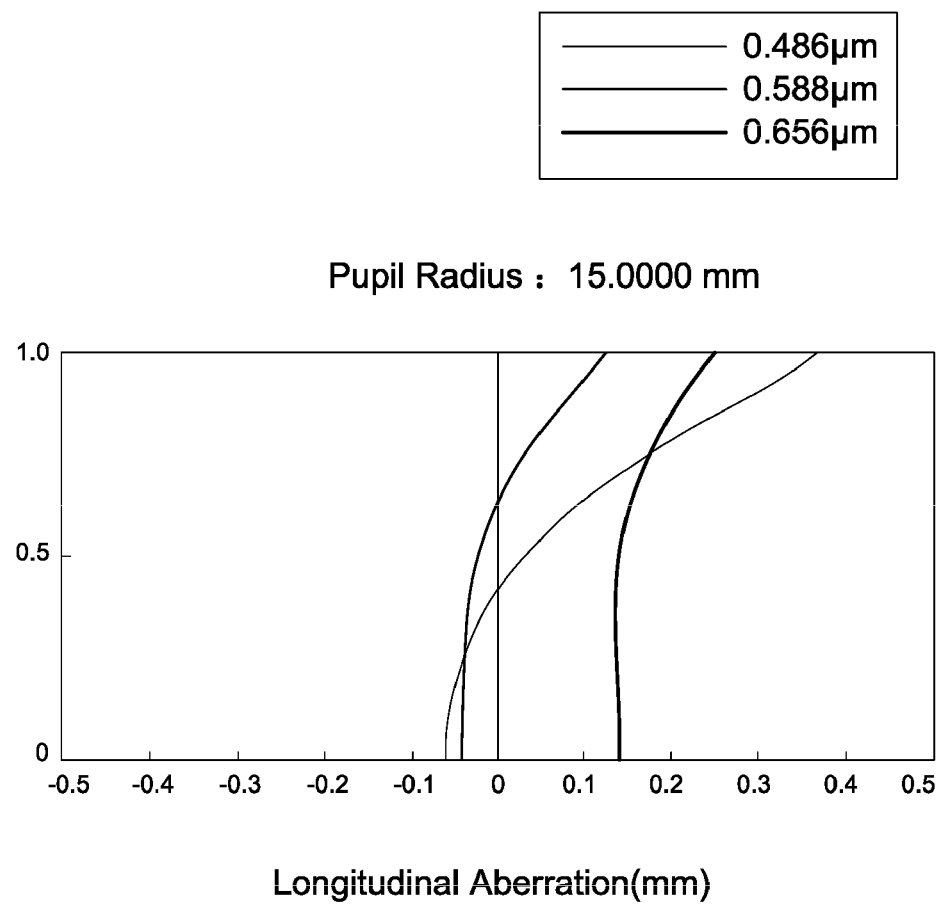
FIG. 12 depicts a longitudinal aberration diagram of the optical system under no shake condition in accordance with the third embodiment of the invention.
Figure 13:
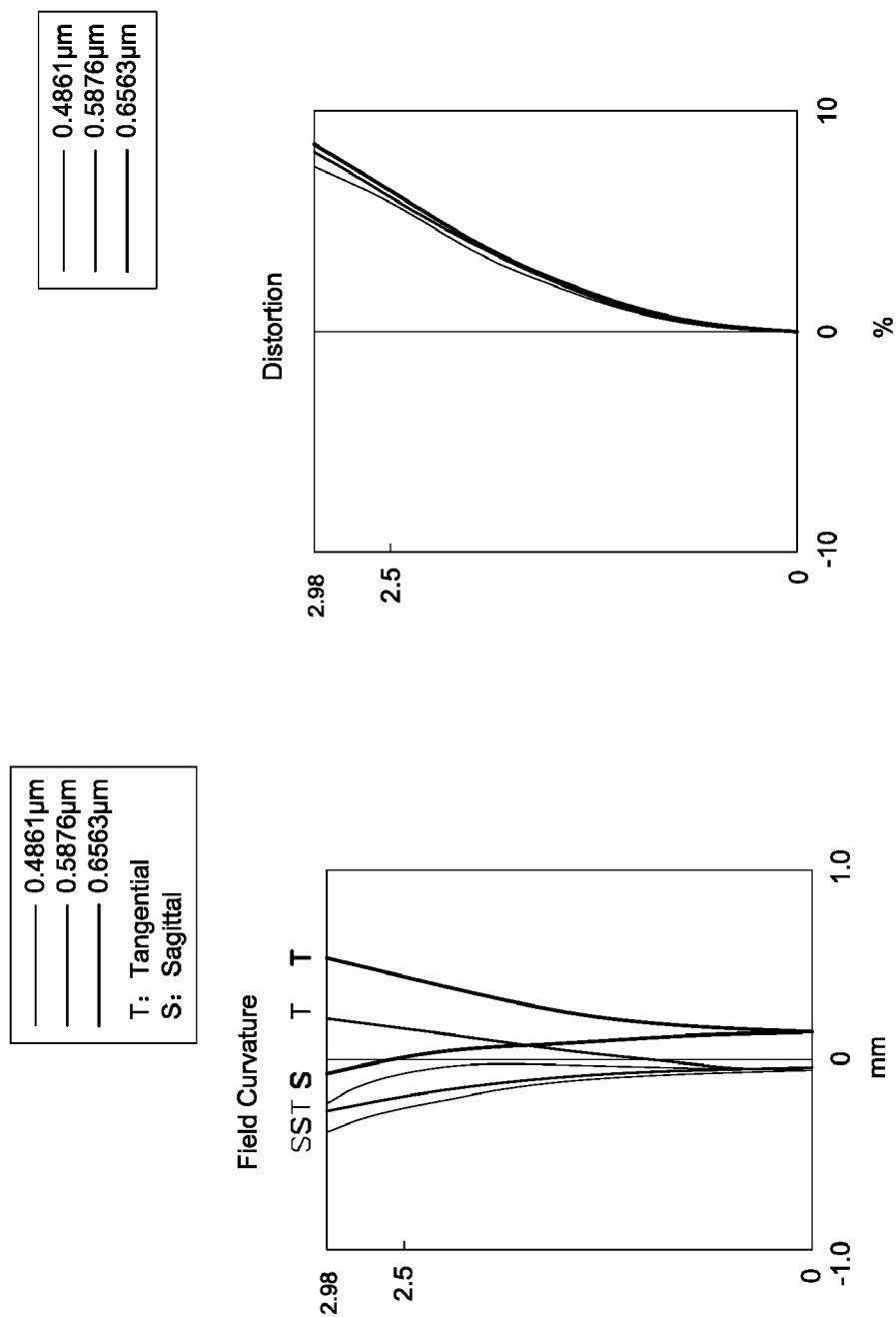
FIG. 13 is a field curvature and a distortion diagrams of the optical system under no shake condition in accordance with the third embodiment of the invention.
Figure 14:
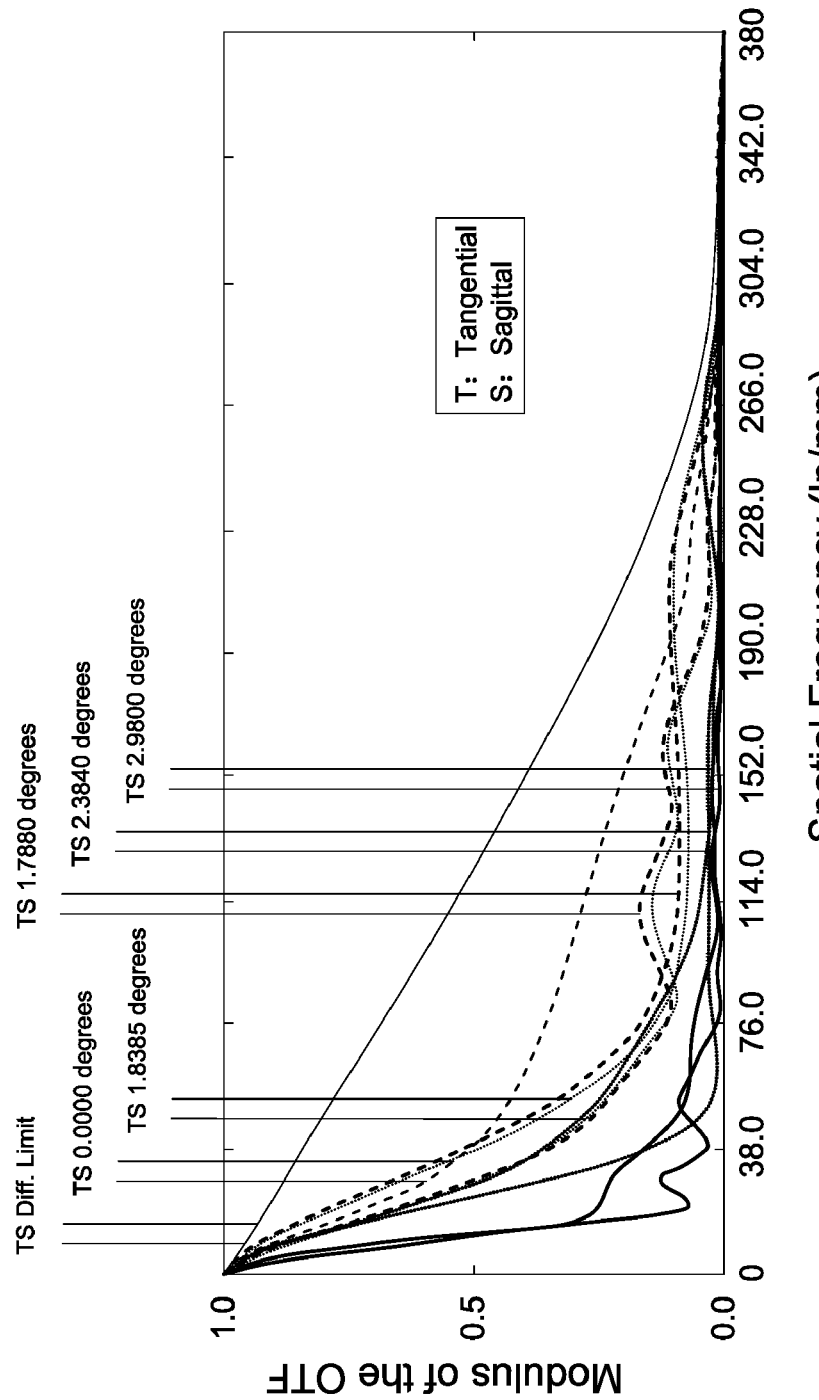
FIG. 14 is a modulation transfer function diagram of the optical system under no shake condition in accordance with the third embodiment of the invention.
Figure 15:
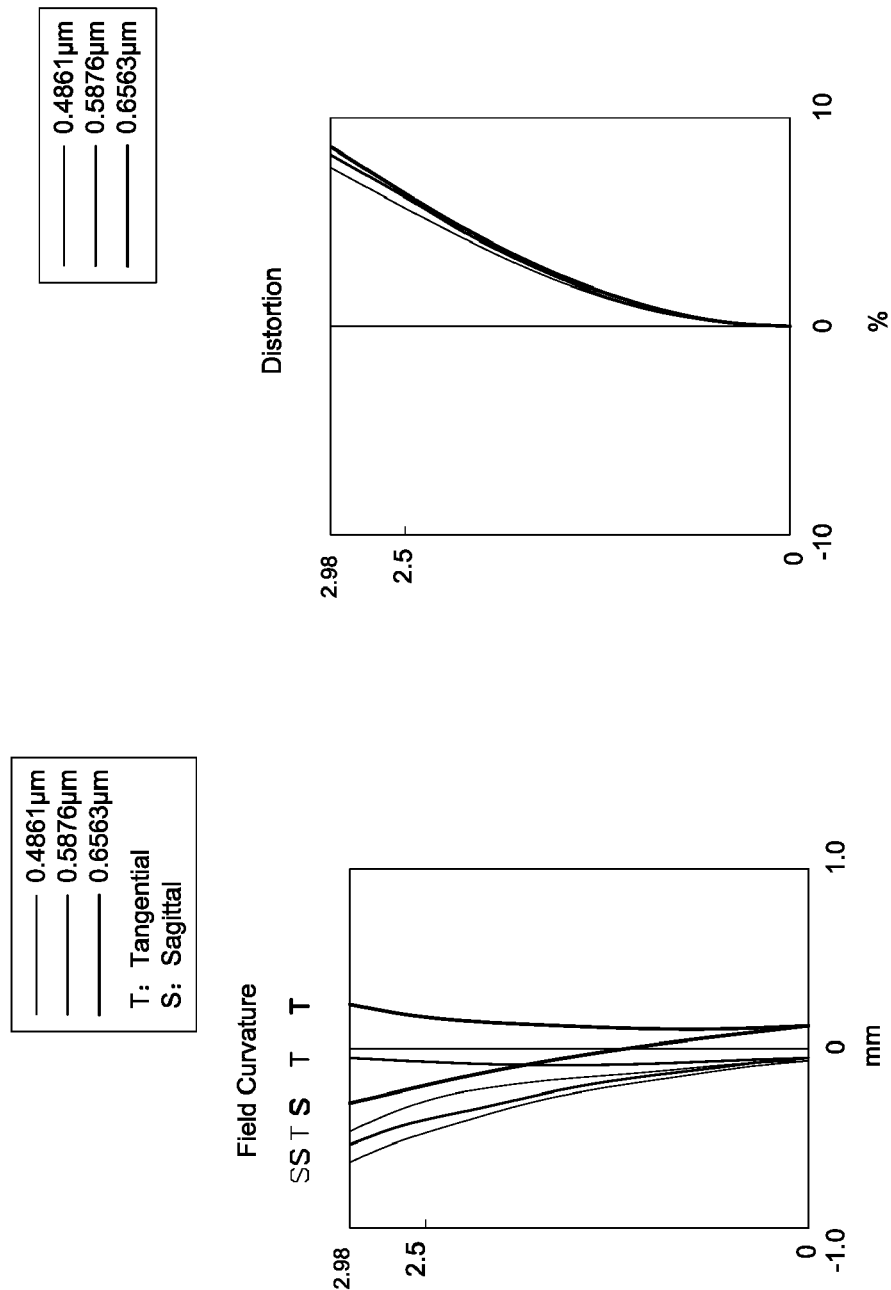
FIG. 15 is a field curvature and a distortion diagrams of the optical system under the condition of maximum shake compensation in accordance with the third embodiment of the invention.
Figure 16:
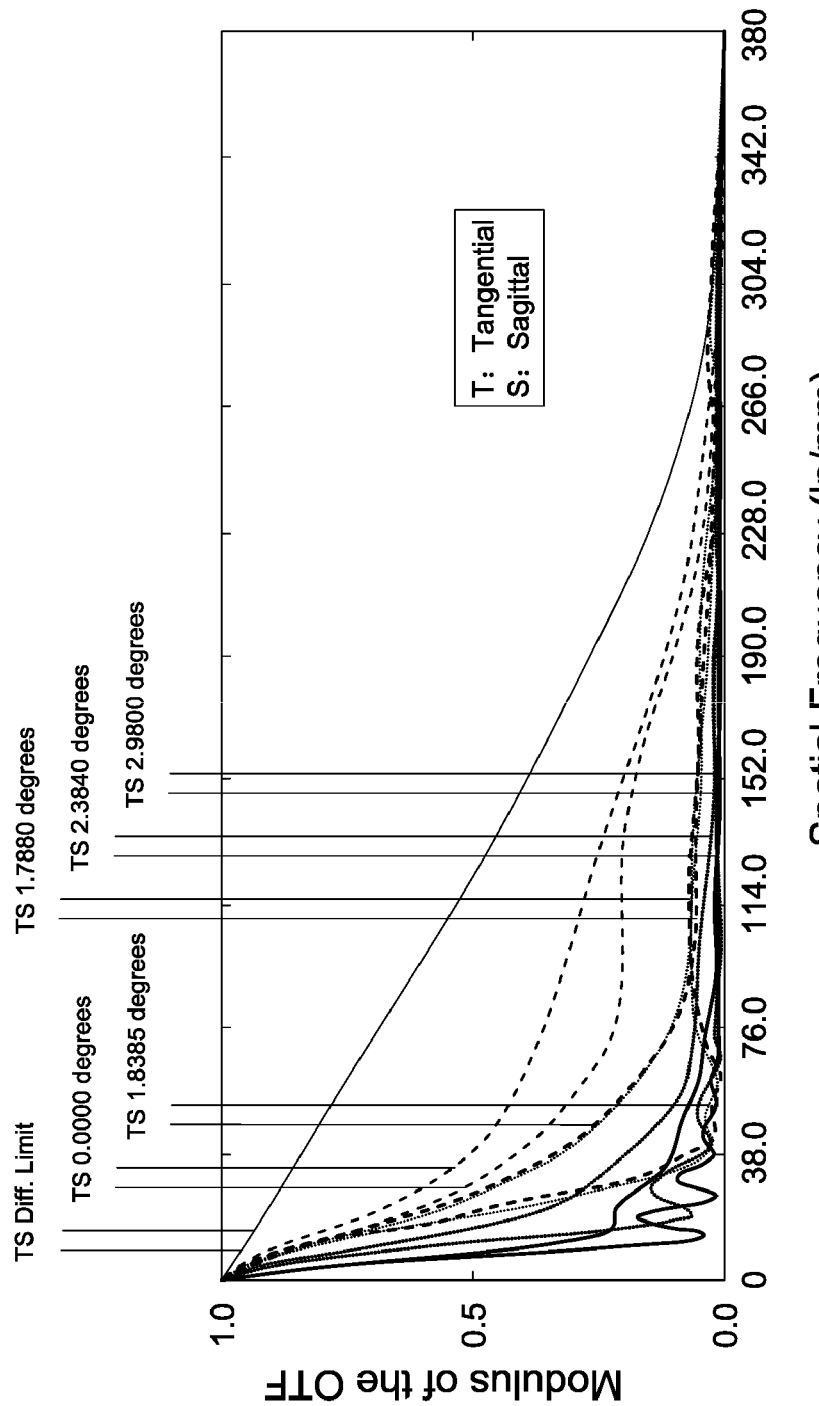
FIG. 16 is a modulation transfer function diagram of the optical system under the condition of maximum shake compensation in accordance with the third embodiment of the invention.

A detailed description of an optical system in accordance with a third embodiment of the invention is as follows. Referring to FIG. 11, the optical system 3 includes an objective lens module LG3OBJ, an image inverting module LG3PS, and an eyepiece module LG3EYE, all of which are arranged in order from an object side to an image side along an optical axis OA3. The objective lens module LG3OBJ includes a first lens groups LG31, a second lens group LG32, a third lens group LG33, a fourth lens group LG34, and a fifth lens group LG35, all of which are arranged in order from the object side to the image side along the optical axis OA3. The first lens groups LG31 includes a first lens L31 and a second lens L32, both of which are arranged in order from the object side to the image side along the optical axis OA3. The first lens L31 and the second lens L32 are cemented. The second lens group LG32 includes a third lens L33. The third lens group LG33 includes a fourth lens L34. The fourth lens group LG34 includes a fifth lens L35. The fifth lens group LG35 includes a sixth lens L36 and an eleventh lens L311, both of which are arranged in order from the object side to the image side along the optical axis OA3. The sixth lens L36 and the eleventh lens L311 are cemented. The image inverting module LG3PS includes a first prism P31 and a second prism P32, both of which are arranged in order from the object side to the image side along the optical axis OA3. The eyepiece module LG3EYE includes a sixth lens group LG36, a seventh lens group LG37, and an eighth lens group LG38, all of which are arranged in order from the object side to the image side along the optical axis OA3. The sixth lens group LG36 includes a seventh lens L37 and an eighth lens L38, both of which are arranged in order from the object side to the image side along the optical axis OA3. The seventh lens L37 and the eighth lens L38 are cemented. The seventh lens group LG37 includes a ninth lens L39. The eighth lens group LG38 includes a tenth lens L310. In operation, a light from the object side sequentially passes through the objective lens module LG3OBJ and the image inverting module LG3PS to form an image on a focal plane S317 and then passes through the eyepiece module LG3EYE to form an image on an image plane IMA3. The second lens group LG32 can move along the optical axis OA3, so that the optical system 3 can achieve focus. The fourth lens group LG34 can move along the direction perpendicular to the optical axis OA3 within a range of 0.6 mm, so that the optical system 3 can achieve optical image stabilization, wherein the compensation angle for the shake of the optical axis can reach ±0.803 degrees.

According to the foregoing, wherein: the first lens L31 is a meniscus lens with negative refractive power, wherein the image side surface S32 is a concave surface; the second lens L32 is a meniscus lens with positive refractive power, wherein the object side surface S32 is a convex surface and the image side surface S33 is a concave surface; the second lens group LG32 is with positive refractive power and the third lens L33 is a meniscus lens with positive refractive power, wherein the object side surface S34 of the third lens L33 is a convex surface; the fourth lens L34 is a biconvex lens, wherein the image side surface S37 is a convex surface; the fifth lens group LG35 is with positive refractive power, the sixth lens L36 is a biconcave lens, and the eleventh lens L311 is a biconvex lens with positive refractive power, wherein the image side surface S311 of the sixth lens L36 is a concave surface, the object side surface S311 of the eleventh lens L311 is a convex surface, and the image side surface S312 of the eleventh lens L311 is a convex surface; the sixth lens L36 and the eleventh lens L311 are cemented; the sixth lens group LG36 is with positive refractive power; and the tenth lens L310 is a plano-convex lens, wherein the image side surface S324 is a plane surface. With the above design of the objective lens module LG3OBJ, image inverting module LG3PS, eyepiece module LG3EYE, and at least one of the conditions (1)-(5) satisfied, the optical system 3 can have an effective corrected aberration and an effective corrected chromatic aberration.

Table 5 shows the optical specification of the optical system 3 in FIG. 11.

TABLE 5

| Surface Number | Radius of Curvature (mm) | Thickness (mm) | Nd | Vd | Effective Focal Length (mm) | Remark |
|---|---|---|---|---|---|---|
| S31 | 64.6 | 2 | 1.7205 | 34.7 | −47.4 | L31 |
| S32 | 22.04 | 6.98 | 1.6172 | 53.9 | 38.7 | L32 |
| S33 | 253.77 | 5.05 | | | | |
| S34 | 30.68 | 5.65 | 1.8503 | 32.2 | 121.7 | L33 |
| S35 | 39.92 | 20.12 | | | | |
| S36 | 22.84 | 5.11 | 1.5935 | 67.3 | 31.6 | L34 |
| S37 | −96.51 | 3.61 | | | | |
| S38 | −433.56 | 1.8 | 1.804 | 46.5 | −15.8 | L35 |
| S39 | 13.07 | 10.5 | | | | |
| S310 | −8.57 | 1.95 | 1.6989 | 30 | −11.81 | L36 |
| S311 | 249.28 | 4.06 | 1.883 | 39.2 | 14.9 | L311 |
| S312 | −13.74 | 3.88 | | | | |
| S313 | ∞ | 27.14 | 1.5688 | 56 | | P31 |
| S314 | ∞ | 0.8 | | | | |
| S315 | ∞ | 51 | 1.5688 | 56 | | P32 |
| S316 | ∞ | 2.41 | | | | |
| S317 | ∞ | 7.07 | | | | Focal Plane |
| S318 | −45.96 | 1.84 | 1.946 | 17.9 | −13.4 | L37 |
| S319 | 17.88 | 8.75 | 1.804 | 46.5 | 14.9 | L38 |
| S320 | −28.75 | 0.45 | | | | |
| S321 | 33.63 | 6 | 1.64 | 60.2 | 40.7 | L39 |
| S322 | −108.08 | 0.45 | | | | |
| S323 | 22.54 | 6 | 1.6131 | 60.3 | 36.8 | L310 |
| S324 | ∞ | 16.18 | | | | |

Table 6 shows the parameters and condition values for conditions (1)-(5) in accordance with the optical system 3 of the third embodiment. It can be seen from Table 6 that the optical system 3 of the third embodiment satisfies the conditions (1)-(5). The preferred embodiment of the present invention can be achieved when the refractive power and surface shape of each lens comply with Table 5 and conditions (1)-(5) are satisfied.

TABLE 6

| LG4D | 14.17 mm | LG1D | 30 mm | fG1 | 238.3 mm |
|---|---|---|---|---|---|
| fG4 | −15.8 mm | fG3 | 31.6 mm | f | 164.88 mm |
| LG4D/LG1D | 0.47 | 1/fG3 | 0.032 mm$^{-1}$ | |1/fG4| | 0.063 mm$^{-1}$ |
| |fG4/fG3| | 0.51 | fG1/f | 1.445 | | |

In addition, the optical system 3 of the third embodiment can meet the requirements of optical performance as seen in FIGS. 12-16. It can be seen from FIG. 12 that the longitudinal aberration in the optical system 3 of the third embodiment under no shake condition ranges from −0.1 mm to 0.4 mm. It can be seen from FIG. 13 that the field curvature of tangential direction and sagittal direction and distortion in the optical system 3 of the third embodiment under no shake condition ranges from −0.4 mm to 0.6 mm and 0% to 9%, respectively. It can be seen from FIG. 14 that the modulation transfer function of tangential direction and sagittal direction in the optical system 3 of the third embodiment under no shake condition ranges from 0 to 1.0. It can be seen from FIG. 15 that the field curvature of tangential direction and sagittal direction and distortion in the optical system 3 of the third embodiment under the condition of maximum shake compensation ranges from −0.7 mm to 0.3 mm and 0% to 9%, respectively. It can be seen from FIG. 16 that the modulation transfer function of tangential direction and sagittal direction in the optical system 3 of the third embodiment under the condition of maximum shake compensation ranges from 0 to 1.0. It is obvious that the longitudinal aberration, the field curvature and the distortion of the optical system 3 of the third embodiment under no shake condition or the condition of maximum shake compensation can be corrected effectively and the image resolution can meet the requirements. Therefore, the optical system 3 of the third embodiment is capable of good optical performance.

Figure 17:
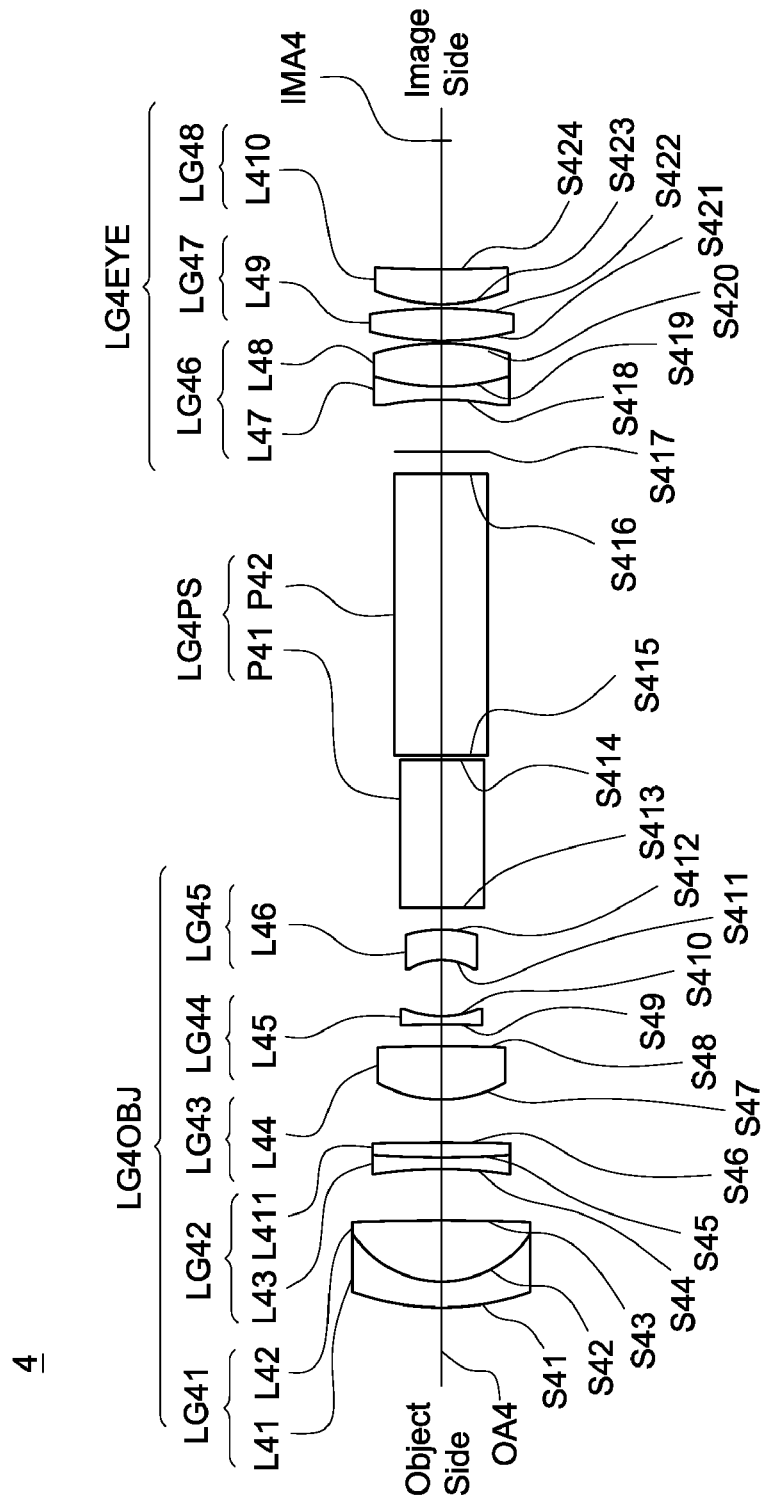
FIG. 17 is a lens layout diagram of an optical system in accordance with a fourth embodiment of the invention.
Figure 18:
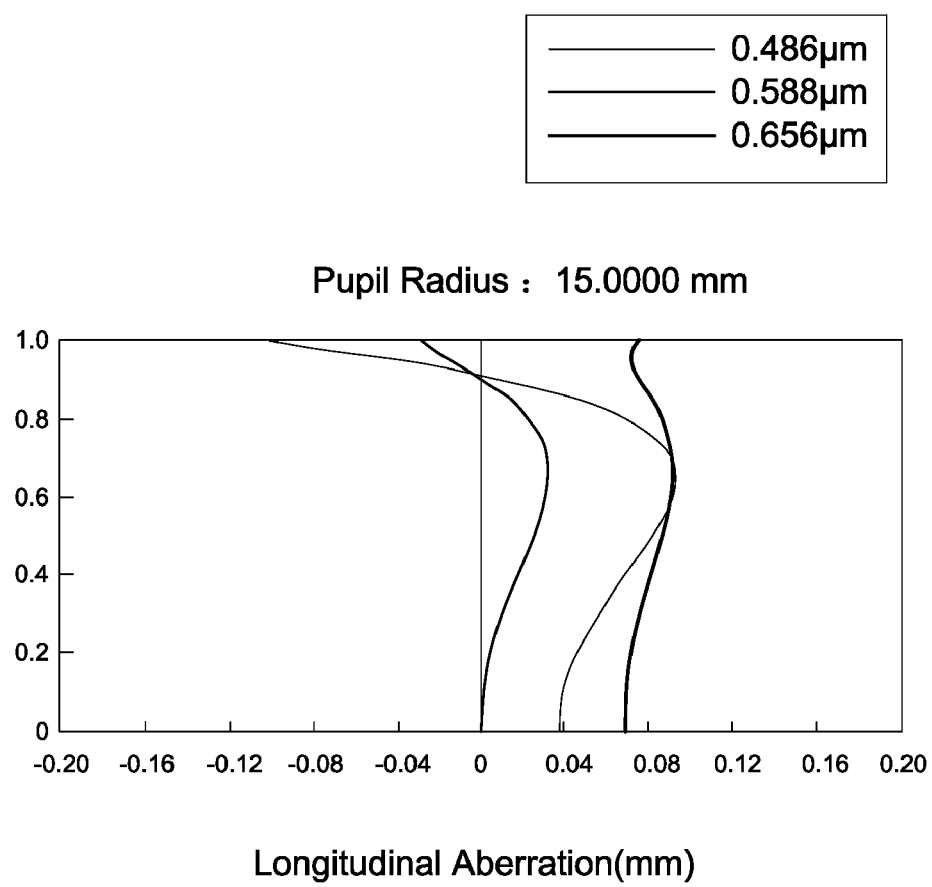
FIG. 18 depicts a longitudinal aberration diagram of the optical system under no shake condition in accordance with the fourth embodiment of the invention.
Figure 19:
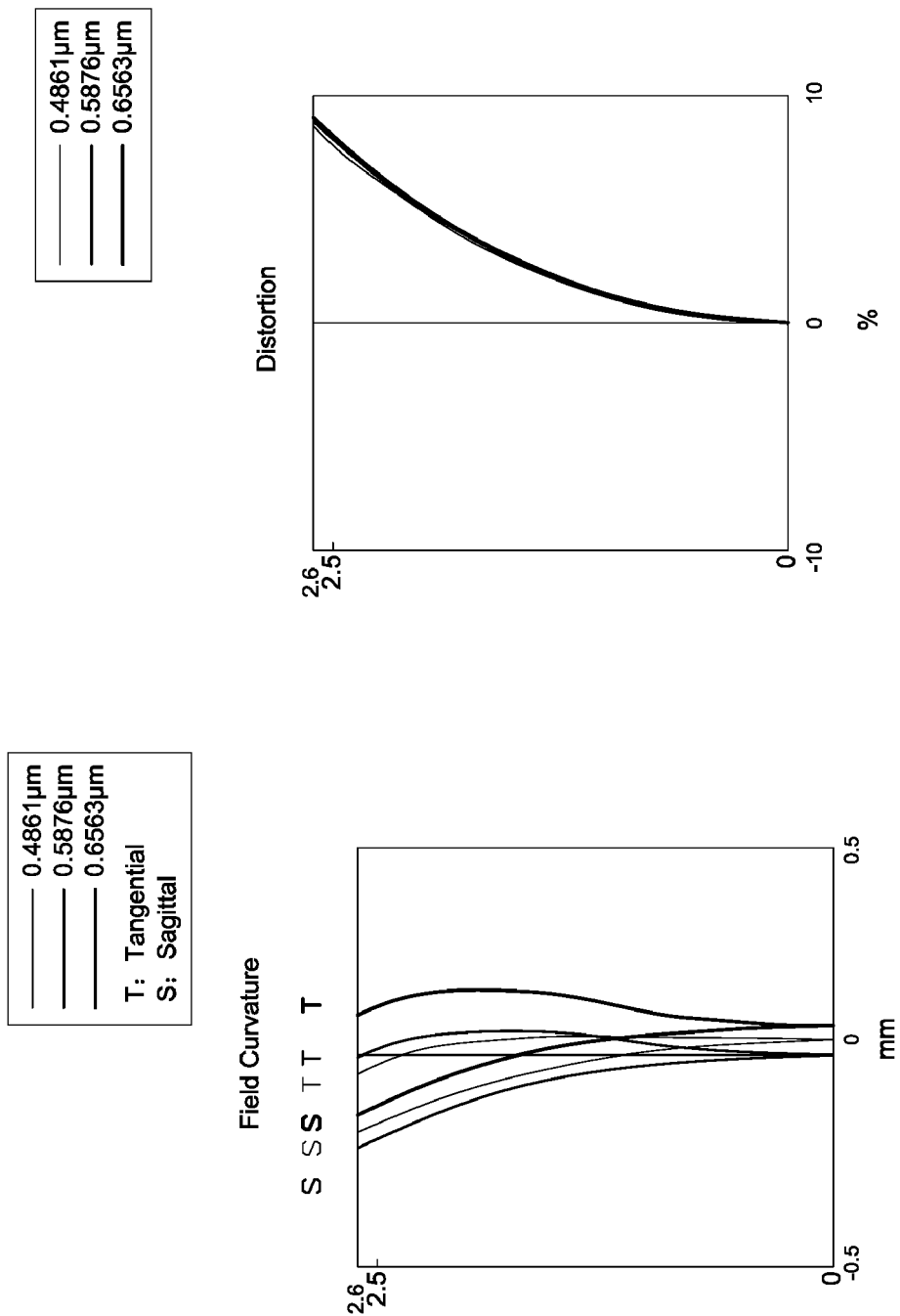
FIG. 19 is a field curvature and a distortion diagrams of the optical system under no shake condition in accordance with the fourth embodiment of the invention.
Figure 20:
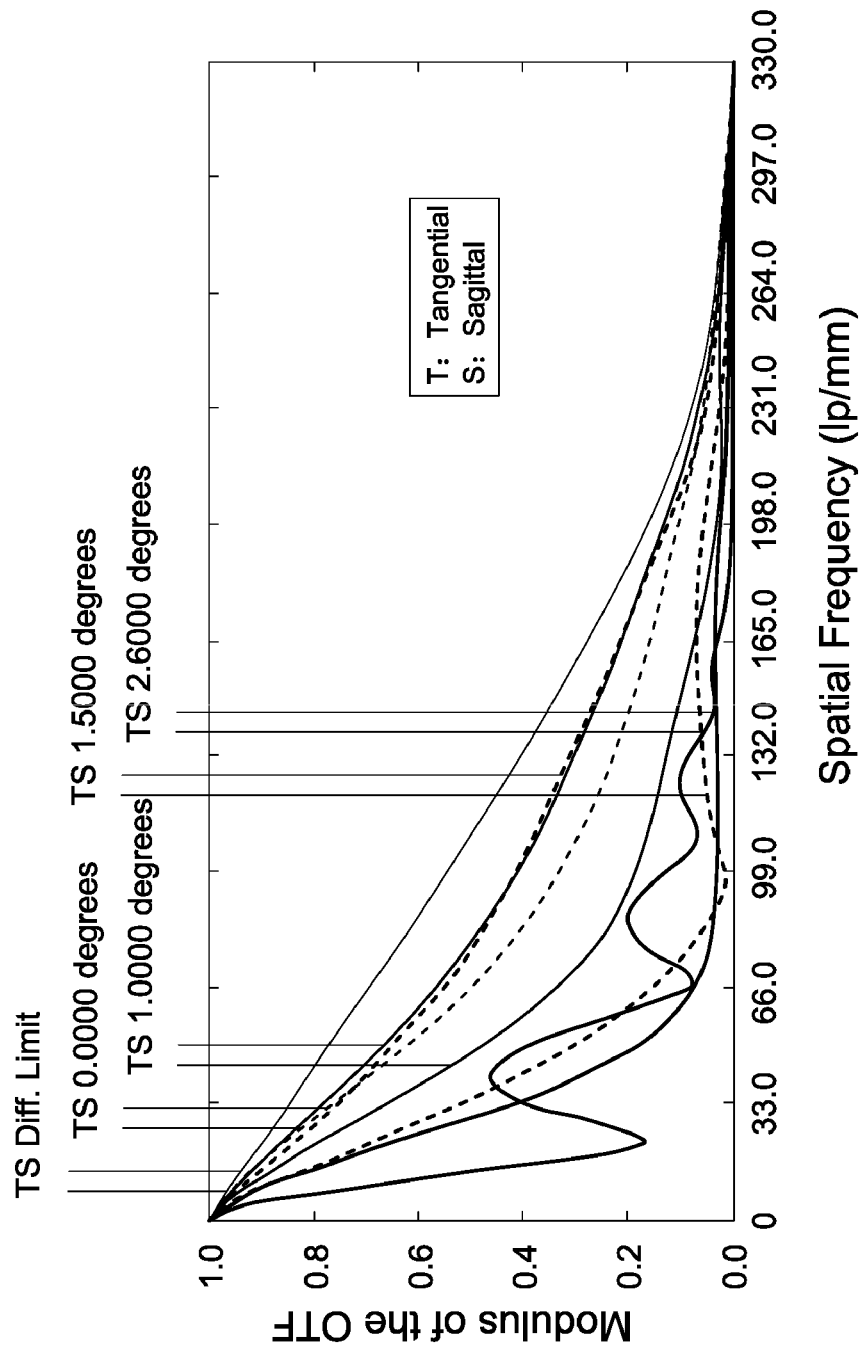
FIG. 20 is a modulation transfer function diagram of the optical system under no shake condition in accordance with the fourth embodiment of the invention.
Figure 21:
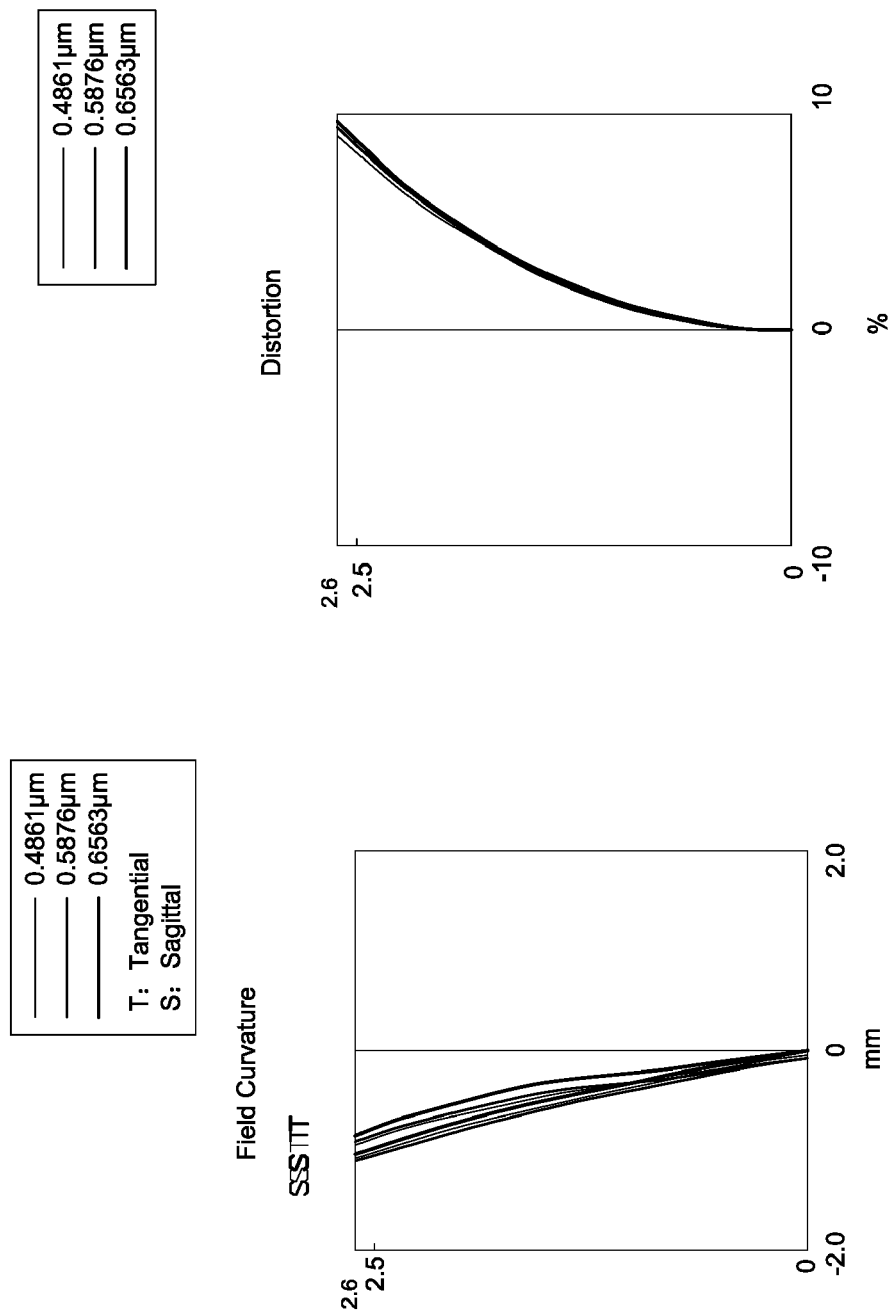
FIG. 21 is a field curvature and a distortion diagrams of the optical system under the condition of maximum shake compensation in accordance with the fourth embodiment of the invention.
Figure 22:
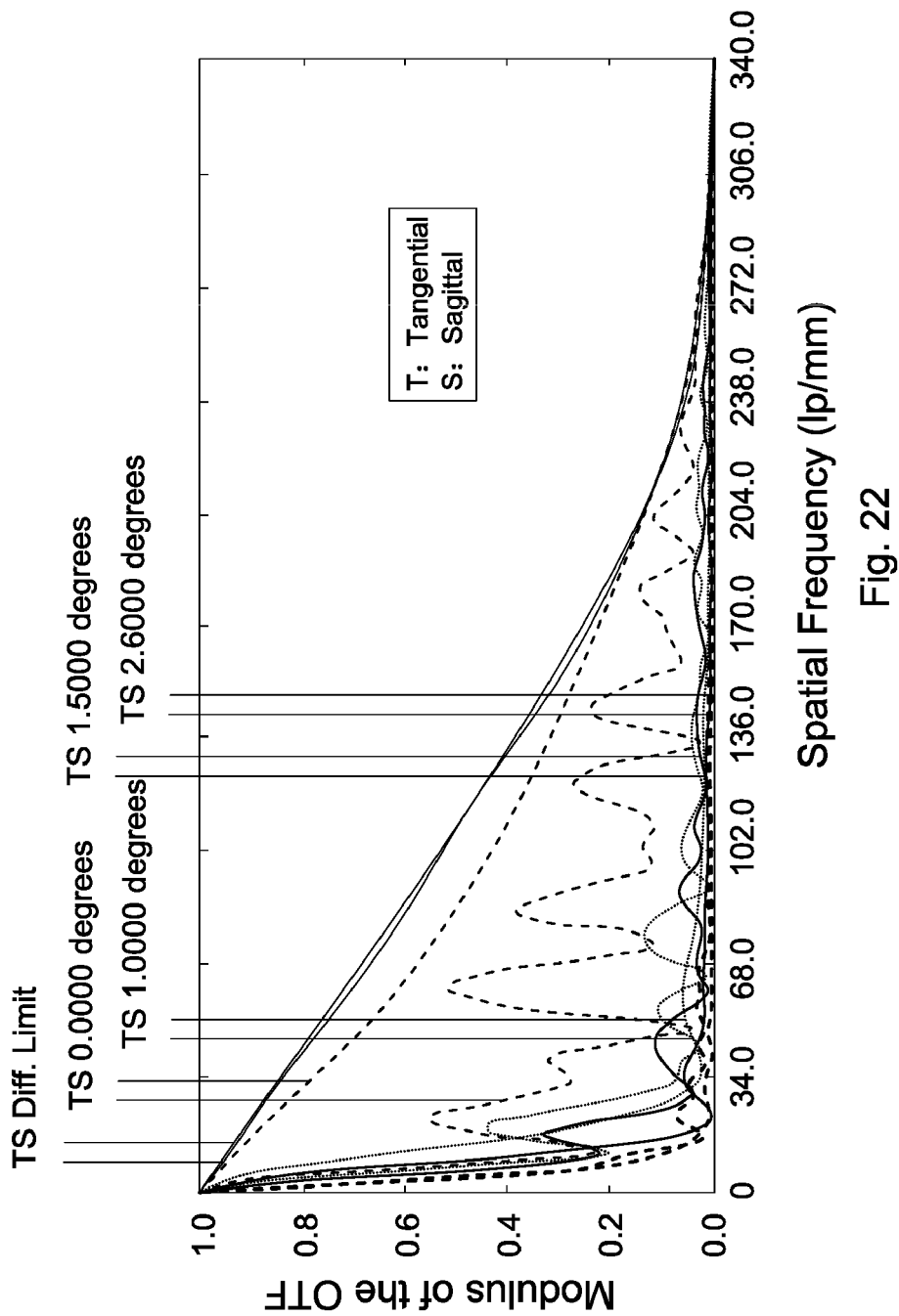
FIG. 22 is a modulation transfer function diagram of the optical system under the condition of maximum shake compensation in accordance with the fourth embodiment of the invention.

A detailed description of an optical system in accordance with a fourth embodiment of the invention is as follows. Referring to FIG. 17, the optical system 4 includes an objective lens module LG4OBJ, an image inverting module LG4PS, and an eyepiece module LG4EYE, all of which are arranged in order from an object side to an image side along an optical axis OA4. The objective lens module LG4OBJ includes a first lens groups LG41, a second lens group LG42, a third lens group LG43, a fourth lens group LG44, and a fifth lens group LG45, all of which are arranged in order from the object side to the image side along the optical axis OA4. The first lens groups LG41 includes a first lens L41 and a second lens L42, both of which are arranged in order from the object side to the image side along the optical axis OA4. The first lens L41 and the second lens L42 are cemented. The second lens group LG42 includes a third lens L43 and an eleventh lens L411, both of which are arranged in order from the object side to the image side along the optical axis OA4. The third lens L43 and the eleventh lens L411 are cemented. The third lens group LG43 includes a fourth lens L44. The fourth lens group LG44 includes a fifth lens L45. The fifth lens group LG45 includes a sixth lens L46. The image inverting module LG4PS includes a first prism P41 and a second prism P42, both of which are arranged in order from the object side to the image side along the optical axis OA4. The eyepiece module LG4EYE includes a sixth lens group LG46, a seventh lens group LG47, and an eighth lens group LG48, all of which are arranged in order from the object side to the image side along the optical axis OA4. The sixth lens group LG46 includes a seventh lens L47 and an eighth lens L48, both of which are arranged in order from the object side to the image side along the optical axis OA4. The seventh lens L47 and the eighth lens L48 are cemented. The seventh lens group LG47 includes a ninth lens L49. The eighth lens group LG48 includes a tenth lens L410. In operation, a light from the object side sequentially passes through the objective lens module LG4OBJ and the image inverting module LG4PS to form an image on a focal plane S417 and then passes through the eyepiece module LG4EYE to form an image on an image plane IMA4. The second lens group LG42 can move along the optical axis OA4, so that the optical system 4 can achieve focus. The fourth lens group LG44 can move along the direction perpendicular to the optical axis OA4 within a range of 0.6 mm, so that the optical system 4 can achieve optical image stabilization, wherein the compensation angle for the shake of the optical axis can reach ±0.74 degrees.

According to the foregoing, wherein: the first lens L41 is a meniscus lens with negative refractive power, wherein the image side surface S42 is a concave surface; the second lens L42 is a biconvex lens with positive refractive power, wherein the object side surface S42 is a convex surface and the image side surface S43 is a convex surface; the second lens group LG42 is with negative refractive power, the third lens L43 is a biconcave lens with negative refractive power, and the eleventh lens L411 is a biconvex lens with positive refractive power, wherein the object side surface S44 of the third lens L43 is a concave surface, the object side surface S46 of the eleventh lens L411 is a convex surface, and the image side surface S47 of the eleventh lens L411 is a convex surface; the third lens L43 and the eleventh lens L411 are cemented; the fourth lens L44 is a biconvex lens, wherein the image side surface S48 is a convex surface; the fifth lens group LG45 is with negative refractive power and the sixth lens L46 is a meniscus lens, wherein the image side surface S412 is a convex surface; the sixth lens group LG46 is with negative refractive power; and the tenth lens L410 is a meniscus lens, wherein the image side surface S424 is a concave surface. With the above design of the objective lens module LG4OBJ, image inverting module LG4PS, eyepiece module LG4EYE, and at least one of the conditions (1)-(5) satisfied, the optical system 4 can have an effective corrected aberration and an effective corrected chromatic aberration.

Table 7 shows the optical specification of the optical system 4 in FIG. 17.

TABLE 7

| Surface Number | Radius of Curvature (mm) | Thickness (mm) | Nd | Vd | Effective Focal Length (mm) | Remark |
|---|---|---|---|---|---|---|
| S41 | 46.805 | 4.651 | 1.6134 | 44.107 | −52.836 | L41 |
| S42 | 18.426 | 10.987 | 1.5691 | 71.304 | 31.312 | L42 |
| S43 | −423.441 | 9.591 | | | | |
| S44 | −84.105 | 1.978 | 1.717 | 47.92 | −69.33 | L43 |
| S45 | 122.744 | 2.53 | 1.6112 | 55.813 | 137.693 | L411 |
| S46 | −265.576 | 7.868 | | | | |
| S47 | 22.802 | 10 | 1.744 | 44.904 | 27.116 | L44 |
| S48 | −142.277 | 3.758 | | | | |
| S49 | −274.166 | 1.5 | 1.8017 | 44.282 | −18.199 | L45 |
| S410 | 15.447 | 10.171 | | | | |
| S411 | −10.722 | 5.659 | 1.7847 | 25.72 | −70.345 | L46 |
| S412 | −16.394 | 3.865 | | | | |
| S413 | ∞ | 27.142 | 1.5688 | 56.041 | | P41 |
| S414 | ∞ | 0.8 | | | | |
| S415 | ∞ | 51 | 1.5688 | 56.041 | | P42 |
| S416 | ∞ | 4 | | | | |
| S417 | ∞ | 9.39 | | | | Focal Plane |
| S418 | −43.943 | 2 | 1.946 | 17.942 | −19.513 | L47 |
| S419 | 32.535 | 8.44 | 1.755 | 52.322 | 22.82 | L48 |
| S420 | −32.535 | 0.25 | | | | |
| S421 | 52.206 | 6.247 | 1.755 | 52.322 | 35.487 | L49 |
| S422 | −52.206 | 0.25 | | | | |
| S423 | 30.473 | 6 | 1.7292 | 54.669 | 53.302 | L410 |
| S424 | 129.396 | 20.793 | | | | |

Table 8 shows the parameters and condition values for conditions (1)-(5) in accordance with the optical system 4 of the fourth embodiment. It can be seen from Table 8 that the optical system 4 of the fourth embodiment satisfies the conditions (1)-(5). The preferred embodiment of the present invention can be achieved when the refractive power and surface shape of each lens comply with Table 7 and conditions (1)-(5) are satisfied.

TABLE 8

| LG4D | 14.68 mm | LG1D | 30 mm | fG1 | 83.459 mm |
|---|---|---|---|---|---|
| fG4 | −18.199 | fG3 | 27.116 mm | f | 189.080 mm |
| LG4D/LG1D | 0.49 | 1/fG3 | 0.037 mm$^{-1}$ | \|1/fG4\| | 0.055 mm$^{-1}$ |
| \|fG4/fG3\| | 0.67 | fG1/f | 0.441 | | |

In addition, the optical system 4 of the fourth embodiment can meet the requirements of optical performance as seen in FIGS. 18-22. It can be seen from FIG. 18 that the longitudinal aberration in the optical system 4 of the fourth embodiment under no shake condition ranges from −0.12 mm to 0.12 mm. It can be seen from FIG. 19 that the field curvature of tangential direction and sagittal direction and distortion in the optical system 4 of the fourth embodiment under no shake condition ranges from −0.3 mm to 0.2 mm and 0% to 10%, respectively. It can be seen from FIG. 20 that the modulation transfer function of tangential direction and sagittal direction in the optical system 4 of the fourth embodiment under no shake condition ranges from 0 to 1.0. It can be seen from FIG. 21 that the field curvature of tangential direction and sagittal direction and distortion in the optical system 4 of the fourth embodiment under the condition of maximum shake compensation ranges from −1.2 mm to 0 mm and 0% to 10%, respectively. It can be seen from FIG. 22 that the modulation transfer function of tangential direction and sagittal direction in the optical system 4 of the fourth embodiment under the condition of maximum shake compensation ranges from 0 to 1.0. It is obvious that the longitudinal aberration, the field curvature and the distortion of the optical system 4 of the fourth embodiment under no shake condition or the condition of maximum shake compensation can be corrected effectively and the image resolution can meet the requirements. Therefore, the optical system 4 of the fourth embodiment is capable of good optical performance.

Figure 23:
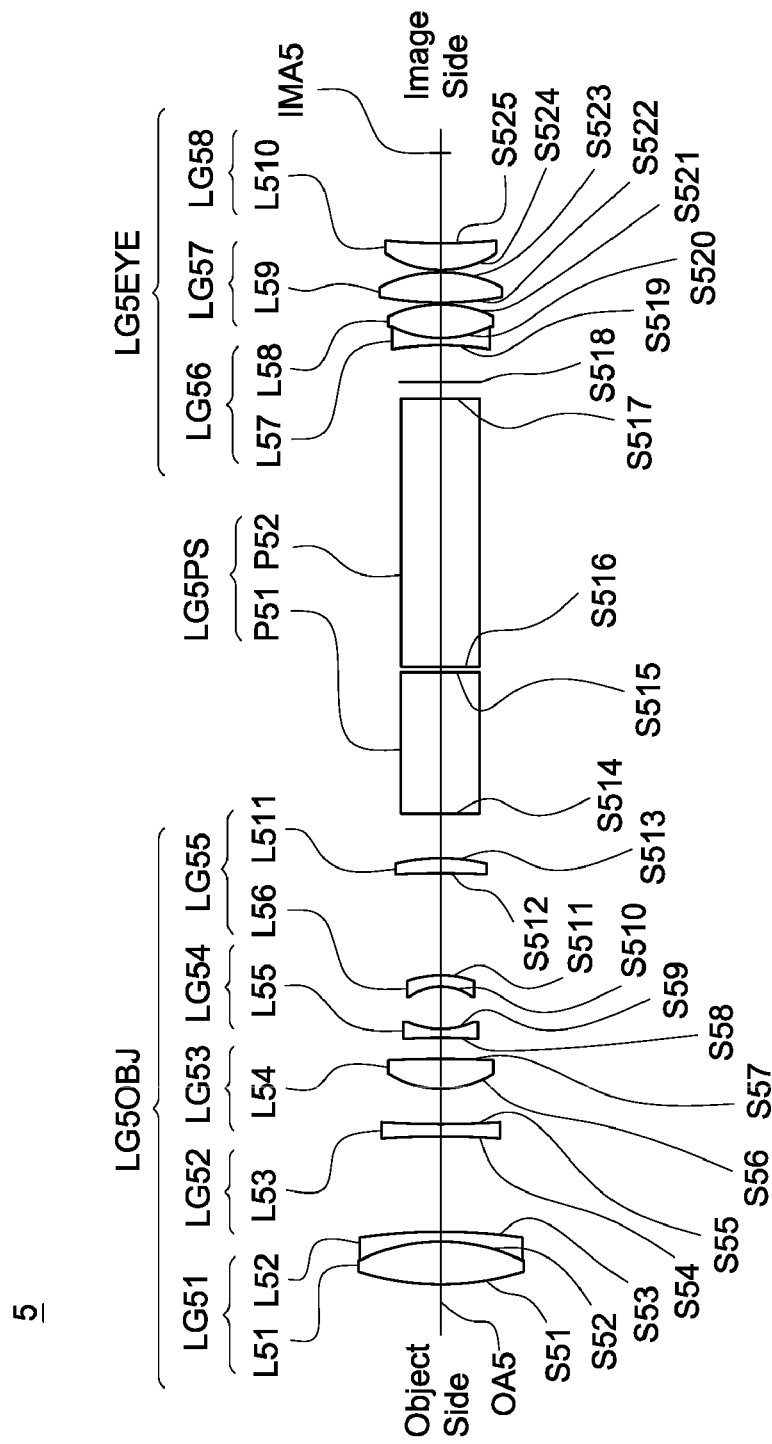
FIG. 23 is a lens layout diagram of an optical system in accordance with a fifth embodiment of the invention.
Figure 24:
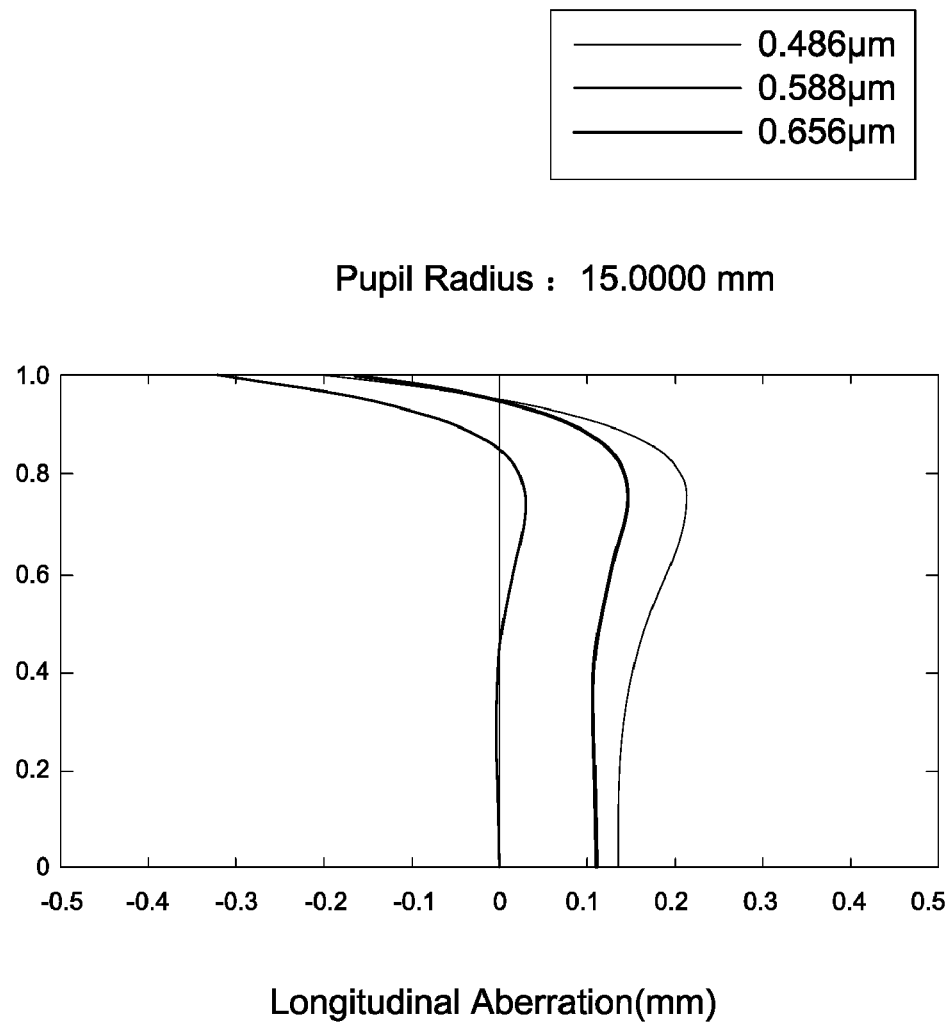
FIG. 24 depicts a longitudinal aberration diagram of the optical system under no shake condition in accordance with the fifth embodiment of the invention.
Figure 25:
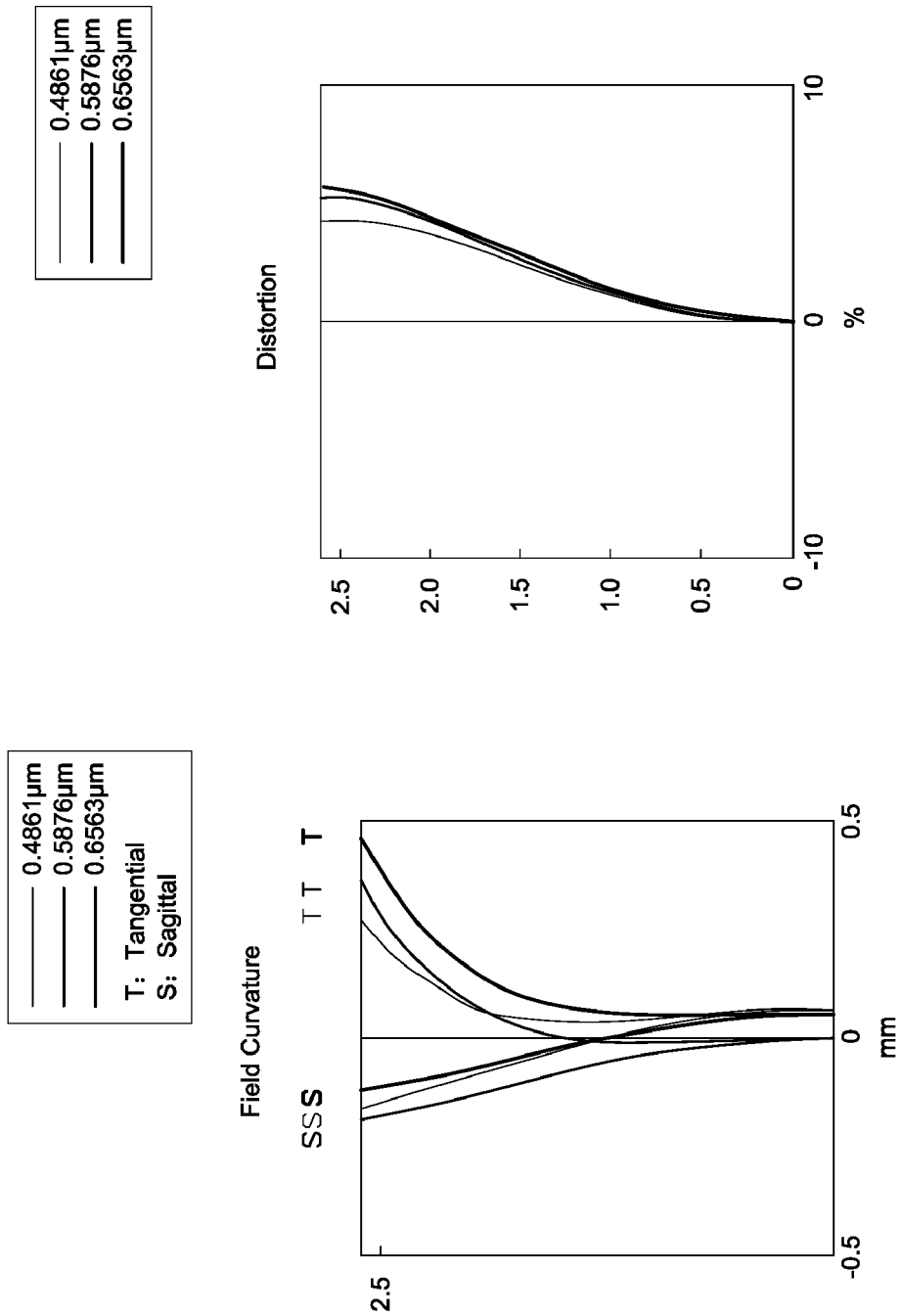
FIG. 25 is a field curvature and a distortion diagrams of the optical system under no shake condition in accordance with the fifth embodiment of the invention.
Figure 26:
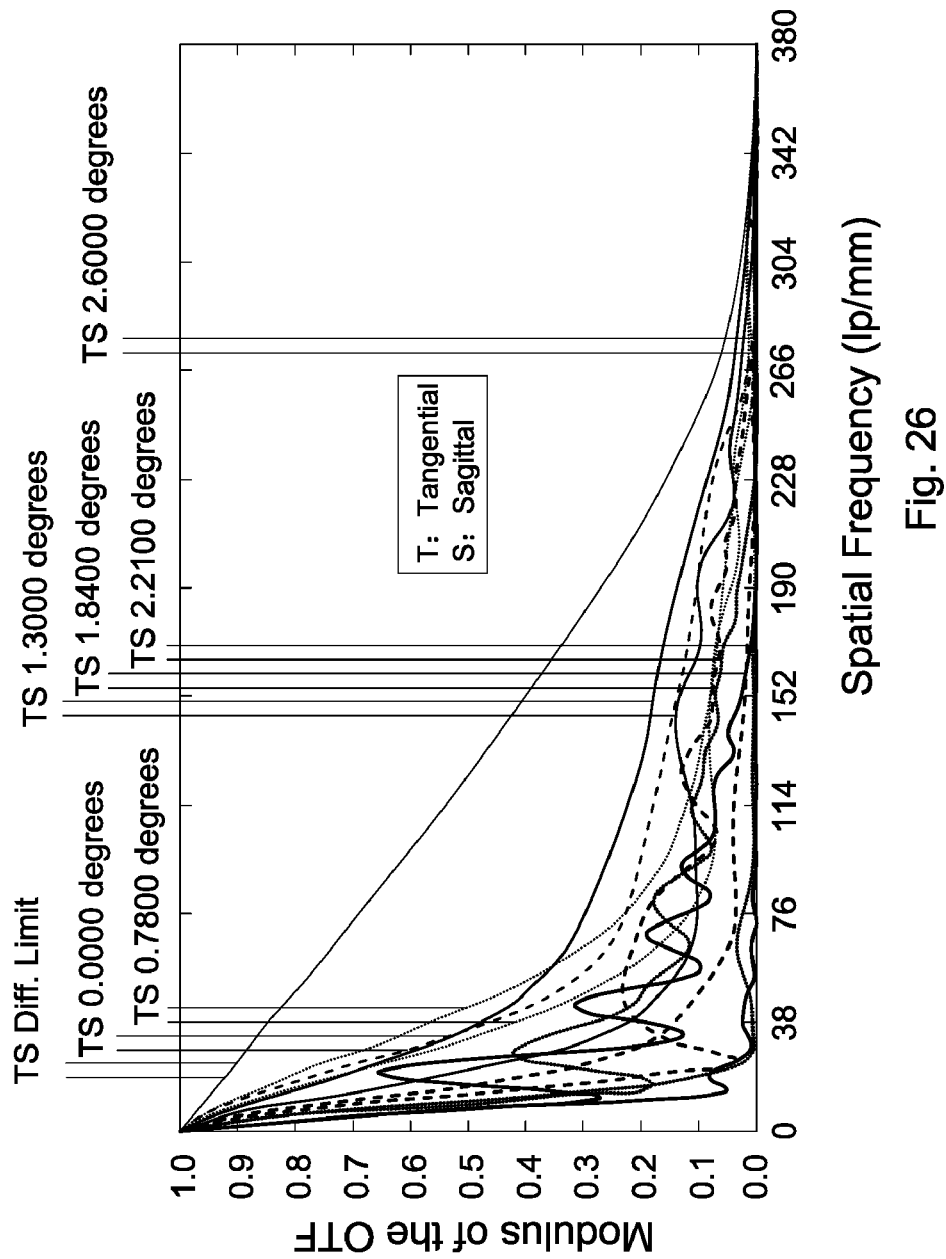
FIG. 26 is a modulation transfer function diagram of the optical system under no shake condition in accordance with the fifth embodiment of the invention.
Figure 27:
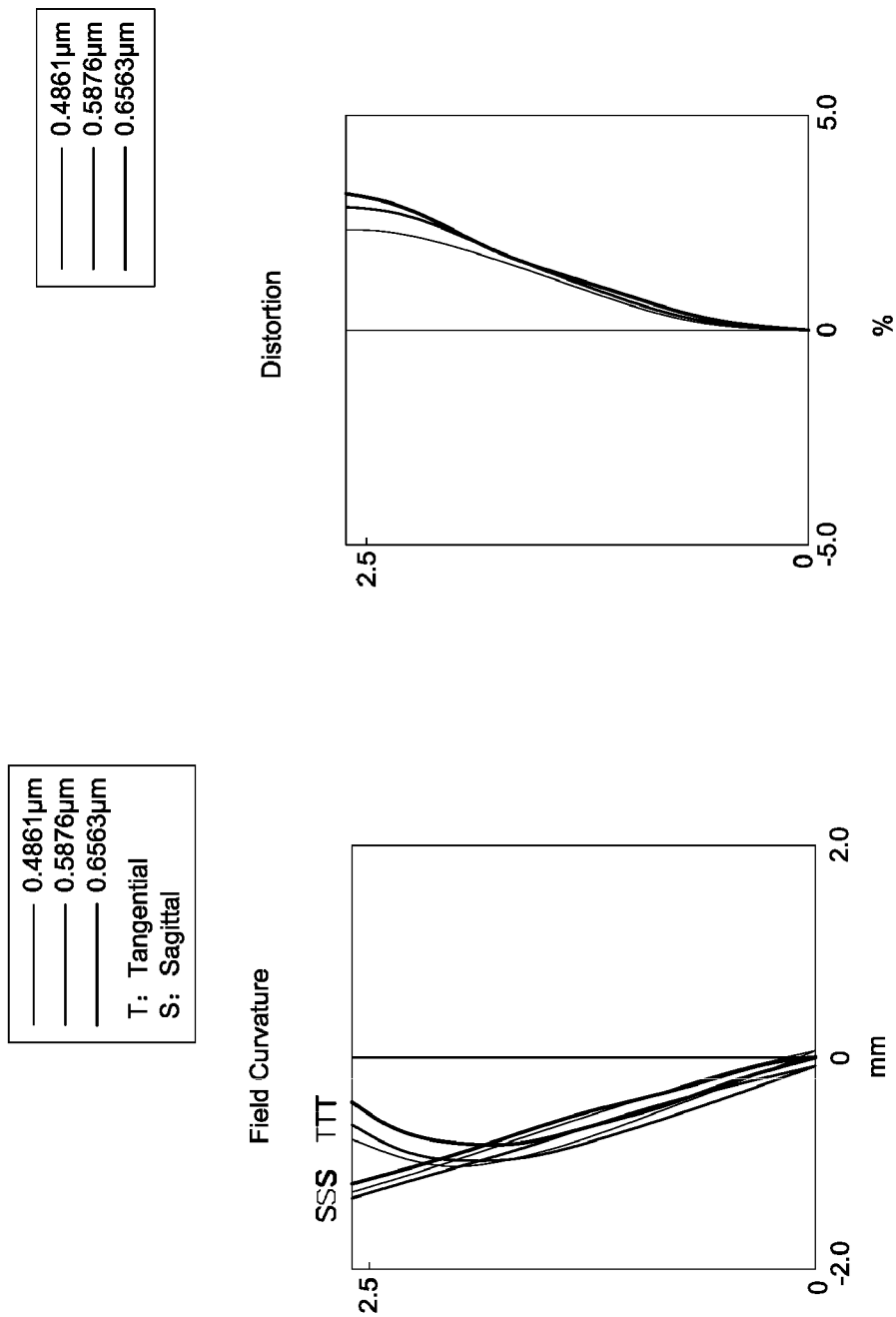
FIG. 27 is a field curvature and a distortion diagrams of the optical system under the condition of maximum shake compensation in accordance with the fifth embodiment of the invention.
Figure 28:
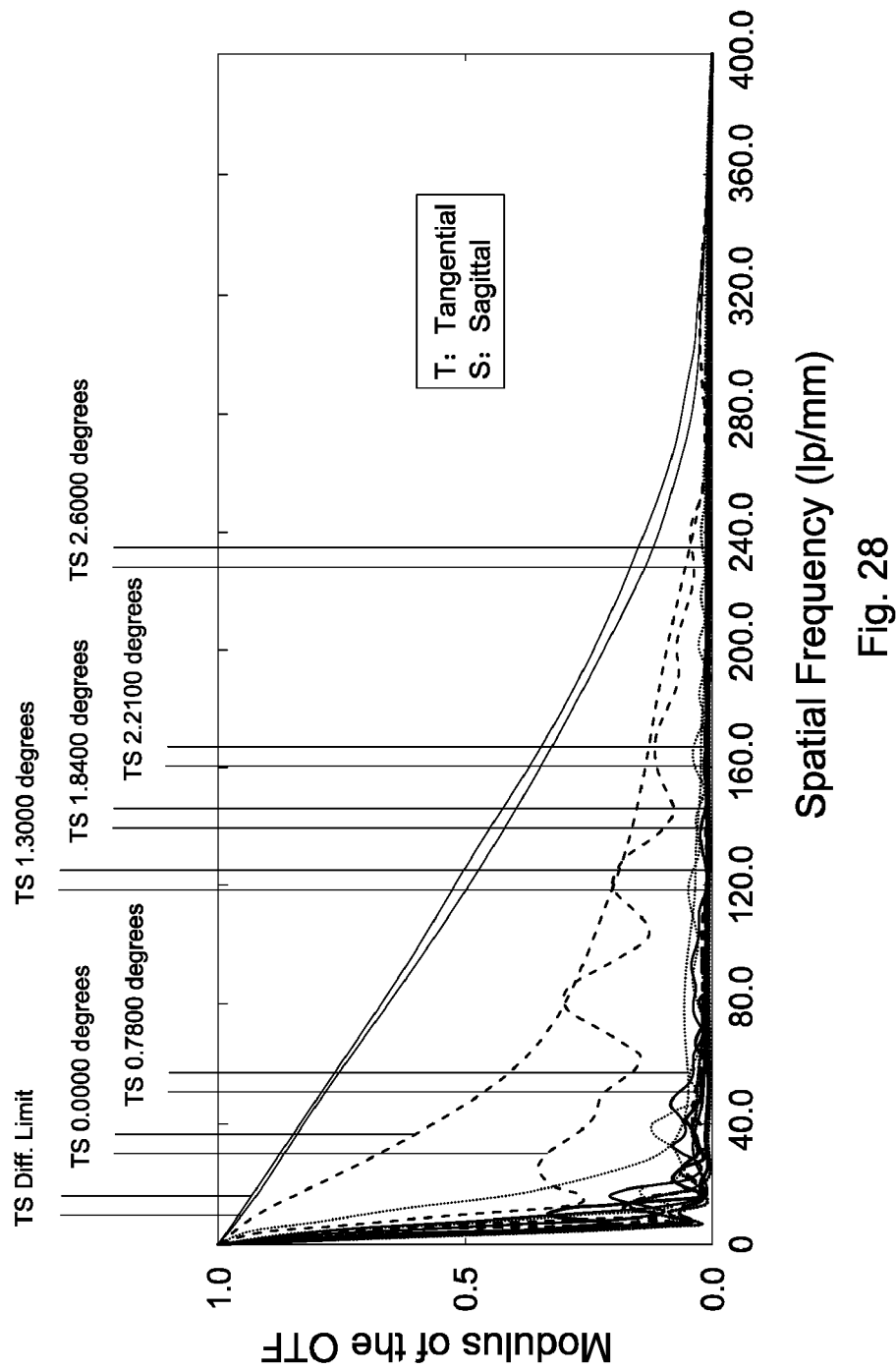
FIG. 28 is a modulation transfer function diagram of the optical system under the condition of maximum shake compensation in accordance with the fifth embodiment of the invention.

A detailed description of an optical system in accordance with a fifth embodiment of the invention is as follows. Referring to FIG. 23, the optical system 5 includes an objective lens module LG5OBJ, an image inverting module LG5PS, and an eyepiece module LG5EYE, all of which are arranged in order from an object side to an image side along an optical axis OA5. The objective lens module LG5OBJ includes a first lens groups LG51, a second lens group LG52, a third lens group LG53, a fourth lens group LG54, and a fifth lens group LG55, all of which are arranged in order from the object side to the image side along the optical axis OA5. The first lens groups LG51 includes a first lens L51 and a second lens L52, both of which are arranged in order from the object side to the image side along the optical axis OA5. The first lens L51 and the second lens L52 are cemented. The second lens group LG52 includes a third lens L53. The third lens group LG53 includes a fourth lens L54. The fourth lens group LG54 includes a fifth lens L55. The fifth lens group LG55 includes a sixth lens L56 and an eleventh lens L511, both of which are arranged in order from the object side to the image side along the optical axis OA5. The image inverting module LG5PS includes a first prism P51 and a second prism P52, both of which are arranged in order from the object side to the image side along the optical axis OAS. The eyepiece module LG5EYE includes a sixth lens group LG56, a seventh lens group LG57, and an eighth lens group LG58, all of which are arranged in order from the object side to the image side along the optical axis OAS. The sixth lens group LG56 includes a seventh lens L57 and an eighth lens L58, both of which are arranged in order from the object side to the image side along the optical axis OAS. The seventh lens L57 and the eighth lens L58 are cemented. The seventh lens group LG57 includes a ninth lens L59. The eighth lens group LG58 includes a tenth lens L510. In operation, a light from the object side sequentially passes through the objective lens module LG5OBJ and the image inverting module LG5PS to form an image on a focal plane S518 and then passes through the eyepiece module LG5EYE to form an image on an image plane IMA5. The second lens group LG52 can move along the optical axis OAS, so that the optical system 5 can achieve focus. The fourth lens group LG54 can move along the direction perpendicular to the optical axis OA5 within a range of 0.6 mm, so that the optical system 5 can achieve optical image stabilization, wherein the compensation angle for the shake of the optical axis can reach ±0.8 degrees.

According to the foregoing, wherein: the first lens L51 is a biconvex lens with positive refractive power, wherein the image side surface S52 is a convex surface; the second lens L52 is a meniscus lens with negative refractive power, wherein the object side surface S52 is a concave surface and the image side surface S53 is a convex surface; the second lens group LG52 is with negative refractive power and the third lens L53 is a biconcave lens with negative refractive power, wherein the object side surface S54 of the third lens L53 is a concave surface; the fourth lens L54 is a biconvex lens, wherein the image side surface S57 is a convex surface; the fifth lens group LG55 is with positive refractive power, the sixth lens L56 is a meniscus lens, and the eleventh lens L511 is a biconvex lens with positive refractive power, wherein the image side surface S511 of the sixth lens L56 is a convex surface, the object side surface S512 of the eleventh lens L511 is a convex surface, and the image side surface S513 of the eleventh lens L511 is a convex surface; the sixth lens group LG56 is with negative refractive power; and the tenth lens L510 is a meniscus lens, wherein the image side surface S525 is a concave surface. With the above design of the objective lens module LG5OBJ, image inverting module LG5PS, eyepiece module LG5EYE, and at least one of the conditions (1)-(5) satisfied, the optical system 5 can have an effective corrected aberration and an effective corrected chromatic aberration.

Table 9 shows the optical specification of the optical system 5 in FIG. 23.

TABLE 9

| Surface Number | Radius of Curvature (mm) | Thickness (mm) | Nd | Vd | Effective Focal Length (mm) | Remark |
|---|---|---|---|---|---|---|
| S51 | 48.252 | 8 | 1.516797 | 64.2124 | 40.808 | L51 |
| S52 | −35.347 | 2 | 1.620047 | 36.3479 | −83.578 | L52 |
| S53 | −113.591 | 18.198 | | | | |
| S54 | −148.033 | 2 | 1.514778 | 60.6072 | −106.597 | L53 |
| S55 | 87.597 | 6.832 | | | | |
| S56 | 17.466 | 5.7 | 1.5928 | 68.3459 | 26.269 | L54 |
| S57 | −126.159 | 4.147 | | | | |
| S58 | −117.86 | 1.5 | 1.801663 | 44.2823 | −16.174 | L55 |
| S59 | 14.652 | 8.206 | | | | |
| S510 | −9.737 | 2 | 1.470466 | 66.8845 | −41.063 | L56 |
| S511 | −20.922 | 19.584 | | | | |
| S512 | 174.221 | 2.7 | 1.744004 | 44.8042 | 50.574 | L511 |
| S513 | −31.149 | 8.247 | | | | |
| S514 | ∞ | 27.142 | 1.568832 | 56.0596 | | P51 |
| S515 | ∞ | 0.8 | | | | |

TABLE 9-continued

| Surface Number | Radius of Curvature (mm) | Thickness (mm) | Nd | Vd | Effective Focal Length (mm) | Remark |
|---|---|---|---|---|---|---|
| S516 | ∞ | 51 | 1.568832 | 56.0596 | | P52 |
| S517 | ∞ | 2.979 | | | | |
| S518 | ∞ | 7.018 | | | | Focal Plane |
| S519 | −60.335 | 1.5 | 1.945958 | 17.9439 | −16.687 | L57 |
| S520 | 21.637 | 6.3 | 1.499673 | 62.0908 | 22.755 | L58 |
| S521 | −21.637 | 0.25 | | | | |
| S522 | 69.342 | 6 | 1.514778 | 60.6072 | 33.299 | L59 |
| S523 | −22.101 | 0.25 | | | | |
| S524 | 18.021 | 5 | 1.620047 | 36.3479 | 35.422 | L510 |
| S525 | 89.753 | 17.236 | | | | |

Table 10 shows the parameters and condition values for conditions (1)-(5) in accordance with the optical system 5 of the fifth embodiment. It can be seen from Table 10 that the optical system 5 of the fifth embodiment satisfies the conditions (1)-(5). The preferred embodiment of the present invention can be achieved when the refractive power and surface shape of each lens comply with Table 9 and conditions (1)-(5) are satisfied.

TABLE 10

| LG4D | 13.6 mm | LG1D | 30 mm | fG1 | 40.808 mm |
|---|---|---|---|---|---|
| fG4 | −16.174 mm | fG3 | 26.269 mm | f | 167.052 mm |
| LG4D/LG1D | 0.45 | 1/fG3 | 0.038 mm$^{-1}$ | |1/fG4| | 0.062 mm$^{-1}$ |
| |fG4/fG3| | 0.61 | fG1/f | 0.244 | | |

In addition, the optical system 5 of the fifth embodiment can meet the requirements of optical performance as seen in FIGS. 24-28. It can be seen from FIG. 24 that the longitudinal aberration in the optical system 5 of the fifth embodiment under no shake condition ranges from −0.35 mm to 0.25 mm. It can be seen from FIG. 25 that the field curvature of tangential direction and sagittal direction and distortion in the optical system 5 of the fifth embodiment under no shake condition ranges from −0.4 mm to 1.0 mm and 0% to 3%, respectively. It can be seen from FIG. 26 that the modulation transfer function of tangential direction and sagittal direction in the optical system 5 of the fifth embodiment under no shake condition ranges from 0 to 1.0. It can be seen from FIG. 27 that the field curvature of tangential direction and sagittal direction and distortion in the optical system 5 of the fifth embodiment under the condition of maximum shake compensation ranges from −1.3 mm to 0.1 mm and 0% to 4%, respectively. It can be seen from FIG. 28 that the modulation transfer function of tangential direction and sagittal direction in the optical system 5 of the fifth embodiment under the condition of maximum shake compensation ranges from 0 to 1.0. It is obvious that the longitudinal aberration, the field curvature and the distortion of the optical system 5 of the fifth embodiment under no shake condition or the condition of maximum shake compensation can be corrected effectively and the image resolution can meet the requirements. Therefore, the optical system 5 of the fifth embodiment is capable of good optical performance.

The above-mentioned optical system can effectively correct the blurring of optical image caused by shake of hand-held optical equipment, so that it can also be applied to optical equipment such as telescope, rangefinder and sight to effectively improve image blur caused by shake of the user's hands. In addition, the rangefinder originally has a ranging function and some telescopes and sights may also have a ranging function. An optical equipment with a ranging function, wherein a laser beam emitted by the laser transmitting and receiving system can first incident on the image inverting module (or can be called an erect optical module, i.e. the prism set) of the optical system of the present invention and then incident on the objective lens module. The laser beam passes through the objective lens module to an object and the object reflects the laser beam along the original path to pass through the objective lens module first and then the image inverting module (i.e. the prism set), and finally enters the light receiver that should also falls into the scope of the present invention.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical system comprising:
   an objective lens module which is with refractive power and comprises a first lens group, a second lens group, a third lens group, a fourth lens group, and a fifth lens group;
   an image inverting module; and
   an eyepiece module;
   wherein the objective lens module, the image inverting module, and the eyepiece module are arranged in order from an object side to an image side along an optical axis;
   wherein the first lens group, the second lens group, the third lens group, the fourth lens group, and the fifth lens group are arranged in order from the object side to the image side along the optical axis;
   wherein the optical system satisfies at least one of following conditions:

$0.45 \leq LG4D/LG1D \leq 0.8$;

$0.015 \text{ mm}^{-1} \leq 1/fG3 \leq 0.045 \text{ mm}^{-1}$;

$0.045 \text{ mm}^{-1} \leq |1/fG4| \leq 0.07 \text{ mm}^{-1}$;

$0.35 \leq |fG4/fG3| \leq 0.75$;

$0.15 \leq fG1/f \leq 1.6$;

wherein LG4D is an effective optical diameter of the fourth lens group, LG1D is an effective optical diameter of the first lens group, fG1 is an effective focal length of the first lens group, fG3 is an effective focal length of the third lens group, fG4 is an effective focal length of the fourth lens group, and f is an effective focal length of the objective lens module.

2. The optical system as claimed in claim 1, wherein:
the image inverting module comprises a first prism and a second prism;
the eyepiece module is with refractive power and comprises a sixth lens group, a seventh lens group, and an eighth lens group;
the sixth lens group, the seventh lens group, and the eighth lens group are arranged in order from the object side to the image side along the optical axis;
the first lens group is with positive refractive power;
the second lens group is with refractive power and comprises a third lens, wherein the third lens comprises a concave surface facing the image side;
the third lens group is with positive refractive power and comprises a fourth lens, wherein the fourth lens comprises a convex surface facing the object side;
the fourth lens group is with negative refractive power and comprises a fifth lens, wherein the fifth lens is a biconcave lens with negative refractive power and comprises a concave surface facing the object side and another concave surface facing the image side;
the fifth lens group is with refractive power and comprises a sixth lens, wherein the sixth lens is with negative refractive power and comprises a concave surface facing the object side;
the sixth lens group is with refractive power;
the seventh lens group is with refractive power;
the eighth lens group is with refractive power;
the second lens group can move along the optical axis, so that the optical system can achieve focus; and
the fourth lens group can move along the direction perpendicular to the optical axis, so that the optical system can achieve optical image stabilization.

3. The optical system as claimed in claim 2, wherein:
the fifth lens group comprises a sixth lens and an eleventh lens, wherein the eleventh lens is disposed between the sixth lens and the image inverting module;
the sixth lens is with negative refractive power and comprises a concave surface facing the object side; and
the eleventh lens is a biconvex lens with positive refractive power and comprises a convex surface facing the object side and another convex surface facing the image side.

4. The optical system as claimed in claim 3, wherein:
the second lens group is with positive refractive power and the third lens is a meniscus lens and further comprises a convex surface facing the object side;
the fourth lens is a meniscus lens with positive refractive power and further comprises a concave surface facing the image side;
the fifth lens group is with negative refractive power and the sixth lens is a biconcave lens with negative refractive power and further comprises another concave surface facing the image side;
the sixth lens and the eleventh lens are cemented;
the sixth lens group is with positive refractive power and comprises a seventh lens and an eighth lens, wherein the seventh lens is a biconcave lens with negative refractive power and comprises a concave surface facing the object side and another concave surface facing the image side, the eighth lens is a biconvex lens with positive refractive power and comprises a convex surface facing the object side and another convex surface facing the image side, the seventh lens and the eighth lens are arranged in order from the object side to the image side along the optical axis, and the seventh lens and the eighth lens are cemented;
the seventh lens group is with positive refractive power and comprises a ninth lens, wherein the ninth lens is a biconvex lens with positive refractive power and comprises a convex surface facing the object side and another convex surface facing the image side; and
the eighth lens group is with positive refractive power and comprises a tenth lens, wherein the tenth lens is a plano-convex lens with positive refractive power and comprises a convex surface facing the object side and a plane surface facing the image side.

5. The optical system as claimed in claim 4, wherein:
the first lens group comprises a first lens and a second lens;
the first lens is a biconvex lens with positive refractive power and comprises a convex surface facing the object side and another convex surface facing the image side;
the second lens is a biconcave lens with negative refractive power and comprises a concave surface facing the object side and another concave surface facing the image side;
the first lens and the second lens are cemented; and
the first lens and the second lens are arranged in order from the object side to the image side along the optical axis.

6. The optical system as claimed in claim 3, wherein:
the second lens group is with positive refractive power and the third lens is a meniscus lens and further comprises a convex surface facing the object side;
the fourth lens is a biconvex lens with positive refractive power and further comprises another convex surface facing the image side;
the fifth lens group is with positive refractive power and the sixth lens is a biconcave lens with negative refractive power and further comprises another concave surface facing the image side;
the sixth lens and the eleventh lens are cemented;
the sixth lens group is with positive refractive power and comprises a seventh lens and an eighth lens, wherein the seventh lens is a biconcave lens with negative refractive power and comprises a concave surface facing the object side and another concave surface facing the image side, the eighth lens is a biconvex lens with positive refractive power and comprises a convex surface facing the object side and another convex surface facing the image side, the seventh lens and the eighth lens are arranged in order from the object side to the image side along the optical axis, and the seventh lens and the eighth lens are cemented;
the seventh lens group is with positive refractive power and comprises a ninth lens, wherein the ninth lens is a biconvex lens with positive refractive power and comprises a convex surface facing the object side and another convex surface facing the image side; and
the eighth lens group is with positive refractive power and comprises a tenth lens, wherein the tenth lens is a plano-convex lens with positive refractive power and comprises a convex surface facing the object side and a plane surface facing the image side.

7. The optical system as claimed in claim 6, wherein:
the first lens group comprises a first lens and a second lens;
the first lens is a meniscus lens with negative refractive power and comprises a convex surface facing the object side and a concave surface facing the image side;
the second lens is a meniscus lens with positive refractive power and comprises a convex surface facing the object side and a concave surface facing the image side;

the first lens and the second lens are cemented; and
the first lens and the second lens are arranged in order from the object side to the image side along the optical axis.

8. The optical system as claimed in claim 3, wherein:
the first lens group comprises a first lens and a second lens, wherein the first lens is a biconvex lens with positive refractive power and comprises a convex surface facing the object side and another convex surface facing the image side, the second lens is a meniscus lens with negative refractive power and comprises a concave surface facing the object side and a convex surface facing the image side, the first lens and the second lens are cemented, and the first lens and the second lens are arranged in order from the object side to the image side along the optical axis;
the second lens group is with negative refractive power and the third lens is a biconcave lens and further comprises another concave surface facing the object side;
the fourth lens is a biconvex lens with positive refractive power and further comprises another convex surface facing the image side;
the fifth lens group is with positive refractive power and the sixth lens is a meniscus lens with negative refractive power and further comprises a convex surface facing the image side;
the sixth lens group is with negative refractive power and comprises a seventh lens and an eighth lens, wherein the seventh lens is a biconcave lens with negative refractive power and comprises a concave surface facing the object side and another concave surface facing the image side, the eighth lens is a biconvex lens with positive refractive power and comprises a convex surface facing the object side and another convex surface facing the image side, the seventh lens and the eighth lens are arranged in order from the object side to the image side along the optical axis, and the seventh lens and the eighth lens are cemented;
the seventh lens group is with positive refractive power and comprises a ninth lens, wherein the ninth lens is a biconvex lens with positive refractive power and comprises a convex surface facing the object side and another convex surface facing the image side; and
the eighth lens group is with positive refractive power and comprises a tenth lens, wherein the tenth lens is a meniscus lens with positive refractive power and comprises a convex surface facing the object side and a concave surface facing the image side.

9. The optical system as claimed in claim 1, wherein:
the second lens group comprises a third lens and an eleventh lens, wherein the eleventh lens is disposed between the third lens and the third lens group;
the second lens group is with negative refractive power;
the third lens is a biconcave lens with negative refractive power and comprises a concave surface facing the object side and another concave surface facing the image side;
the eleventh lens is a biconvex lens with positive refractive power and comprises a convex surface facing the object side and another convex surface facing the image side; and
the third lens and the eleventh lens are cemented.

10. The optical system as claimed in claim 9, wherein:
the first lens group comprises a first lens and a second lens, wherein the first lens is a meniscus lens with negative refractive power and comprises a convex surface facing the object side and a concave surface facing the image side, the second lens is a biconvex lens with positive refractive power and comprises a convex surface facing the object side and another convex surface facing the image side, the first lens and the second lens are cemented, and the first lens and the second lens are arranged in order from the object side to the image side along the optical axis;
the fourth lens is a biconvex lens and further comprises another convex surface facing the image side;
the fifth lens group is with negative refractive power and the sixth lens is a meniscus lens with negative refractive power and further comprises a convex surface facing the image side;
the sixth lens group is with negative refractive power and comprises a seventh lens and an eighth lens, wherein the seventh lens is a biconcave lens with negative refractive power and comprises a concave surface facing the object side and another concave surface facing the image side, the eighth lens is a biconvex lens with positive refractive power and comprises a convex surface facing the object side and another convex surface facing the image side, the seventh lens and the eighth lens are arranged in order from the object side to the image side along the optical axis, and the seventh lens and the eighth lens are cemented;
the seventh lens group is with positive refractive power and comprises a ninth lens, wherein the ninth lens is a biconvex lens with positive refractive power and comprises a convex surface facing the object side and another convex surface facing the image side; and
the eighth lens group is with positive refractive power and comprises a tenth lens, wherein the tenth lens is a meniscus lens with positive refractive power and comprises a convex surface facing the object side and a concave surface facing the image side.

11. The optical system as claimed in claim 1, wherein:
the fifth lens group comprises a sixth lens and an eleventh lens, wherein the eleventh lens is disposed between the sixth lens and the image inverting module;
the sixth lens is with negative refractive power and comprises a concave surface facing the object side; and
the eleventh lens is a biconvex lens with positive refractive power and comprises a convex surface facing the object side and another convex surface facing the image side.

12. The optical system as claimed in claim 11, wherein:
the second lens group is with positive refractive power and comprises a third lens, wherein the third lens is a meniscus lens and comprises a convex surface facing the object side;
the third lens group is with positive refractive power and comprises a fourth lens, wherein the fourth lens is a meniscus lens with positive refractive power and comprises a concave surface facing the image side;
the fifth lens group is with negative refractive power and comprises a sixth lens, wherein the sixth lens is a biconcave lens with negative refractive power and comprises a concave surface facing the object side and another concave surface facing the image side;
the sixth lens and the eleventh lens are cemented;
the sixth lens group is with positive refractive power and comprises a seventh lens and an eighth lens, wherein the seventh lens is a biconcave lens with negative refractive power and comprises a concave surface facing the object side and another concave surface facing the image side, the eighth lens is a biconvex lens with positive refractive power and comprises a convex surface facing the object side and another convex surface facing the image side, the seventh lens and the eighth lens are arranged in order from the object side to the image side along the optical axis, and the seventh lens and the eighth lens are cemented;

the seventh lens group is with positive refractive power and comprises a ninth lens, wherein the ninth lens is a biconvex lens with positive refractive power and comprises a convex surface facing the object side and another convex surface facing the image side; and the eighth lens group is with positive refractive power and comprises a tenth lens, wherein the tenth lens is a plano-convex lens with positive refractive power and comprises a convex surface facing the object side and a plane surface facing the image side.

13. The optical system as claimed in claim 12, wherein:
the first lens group comprises a first lens and a second lens;
the first lens is a biconvex lens with positive refractive power and comprises a convex surface facing the object side and another convex surface facing the image side;
the second lens is a biconcave lens with negative refractive power and comprises a concave surface facing the object side and another concave surface facing the image side;
the first lens and the second lens are cemented; and
the first lens and the second lens are arranged in order from the object side to the image side along the optical axis.

14. The optical system as claimed in claim 11, wherein:
the second lens group is with positive refractive power and comprises a third lens, wherein the third lens is a meniscus lens and comprises a convex surface facing the object side;
the third lens group is with positive refractive power and comprises a fourth lens, wherein the fourth lens is a biconvex lens with positive refractive power and comprises a convex surface facing the object side and another convex surface facing the image side;
the fifth lens group is with positive refractive power and comprises a sixth lens, wherein the sixth lens is a biconcave lens with negative refractive power and comprises a concave surface facing the object side and another concave surface facing the image side;
the sixth lens and the eleventh lens are cemented;
the sixth lens group is with positive refractive power and comprises a seventh lens and an eighth lens, wherein the seventh lens is a biconcave lens with negative refractive power and comprises a concave surface facing the object side and another concave surface facing the image side, the eighth lens is a biconvex lens with positive refractive power and comprises a convex surface facing the object side and another convex surface facing the image side, the seventh lens and the eighth lens are arranged in order from the object side to the image side along the optical axis, and the seventh lens and the eighth lens are cemented;
the seventh lens group is with positive refractive power and comprises a ninth lens, wherein the ninth lens is a biconvex lens with positive refractive power and comprises a convex surface facing the object side and another convex surface facing the image side; and
the eighth lens group is with positive refractive power and comprises a tenth lens, wherein the tenth lens is a plano-convex lens with positive refractive power and comprises a convex surface facing the object side and a plane surface facing the image side.

15. The optical system as claimed in claim 14, wherein:
the first lens group comprises a first lens and a second lens;
the first lens is a meniscus lens with negative refractive power and comprises a convex surface facing the object side and a concave surface facing the image side;
the second lens is a meniscus lens with positive refractive power and comprises a convex surface facing the object side and a concave surface facing the image side;
the first lens and the second lens are cemented; and
the first lens and the second lens are arranged in order from the object side to the image side along the optical axis.

16. The optical system as claimed in claim 11, wherein:
the first lens group comprises a first lens and a second lens, wherein the first lens is a biconvex lens with positive refractive power and comprises a convex surface facing the object side and another convex surface facing the image side, the second lens is a meniscus lens with negative refractive power and comprises a concave surface facing the object side and a convex surface facing the image side, the first lens and the second lens are cemented, and the first lens and the second lens are arranged in order from the object side to the image side along the optical axis;
the second lens group is with negative refractive power and comprises a third lens, wherein the third lens is a biconcave lens with negative refractive power and comprises a concave surface facing the object side and another concave surface facing the image side;
the third lens group is with positive refractive power and comprises a fourth lens, wherein the fourth lens is a biconvex lens with positive refractive power and comprises a convex surface facing the object side and another convex surface facing the image side;
the fifth lens group is with positive refractive power and comprises a sixth lens, wherein the sixth lens is a meniscus lens with negative refractive power and comprises a convex surface facing the image side;
the sixth lens group is with negative refractive power and comprises a seventh lens and an eighth lens, wherein the seventh lens is a biconcave lens with negative refractive power and comprises a concave surface facing the object side and another concave surface facing the image side, the eighth lens is a biconvex lens with positive refractive power and comprises a convex surface facing the object side and another convex surface facing the image side, the seventh lens and the eighth lens are arranged in order from the object side to the image side along the optical axis, and the seventh lens and the eighth lens are cemented;
the seventh lens group is with positive refractive power and comprises a ninth lens, wherein the ninth lens is a biconvex lens with positive refractive power and comprises a convex surface facing the object side and another convex surface facing the image side; and
the eighth lens group is with positive refractive power and comprises a tenth lens, wherein the tenth lens is a meniscus lens with positive refractive power and comprises a convex surface facing the object side and a concave surface facing the image side.

17. The optical system as claimed in claim 2, wherein:
the second lens group further comprises an eleventh lens, wherein the eleventh lens is disposed between the third lens and the third lens group;

the second lens group is with negative refractive power;

the third lens is a biconcave lens with negative refractive power and further comprises another concave surface facing the object side;

the eleventh lens is a biconvex lens with positive refractive power and comprises a convex surface facing the object side and another convex surface facing the image side; and the third lens and the eleventh lens are cemented.

18. The optical system as claimed in claim 17, wherein:

the first lens group comprises a first lens and a second lens, wherein the first lens is a meniscus lens with negative refractive power and comprises a convex surface facing the object side and a concave surface facing the image side, the second lens is a biconvex lens with positive refractive power and comprises a convex surface facing the object side and another convex surface facing the image side, the first lens and the second lens are cemented, and the first lens and the second lens are arranged in order from the object side to the image side along the optical axis;

the fourth lens is a biconvex lens and further comprises another convex surface facing the image side;

the fifth lens group is with negative refractive power and the sixth lens is a meniscus lens and further comprises a convex surface facing the image side;

the sixth lens group is with negative refractive power and comprises a seventh lens and an eighth lens, wherein the seventh lens is a biconcave lens with negative refractive power and comprises a concave surface facing the object side and another concave surface facing the image side, the eighth lens is a biconvex lens with positive refractive power and comprises a convex surface facing the object side and another convex surface facing the image side, the seventh lens and the eighth lens are arranged in order from the object side to the image side along the optical axis, and the seventh lens and the eighth lens are cemented;

the seventh lens group is with positive refractive power and comprises a ninth lens, wherein the ninth lens is a biconvex lens with positive refractive power and comprises a convex surface facing the object side and another convex surface facing the image side; and the eighth lens group is with positive refractive power and comprises a tenth lens, wherein the tenth lens is a meniscus lens with positive refractive power and comprises a convex surface facing the object side and a concave surface facing the image side.

* * * * *